United States Patent
Kawamata et al.

(10) Patent No.: US 11,643,708 B2
(45) Date of Patent: May 9, 2023

(54) NICKEL-BASED SELF-FLUXING ALLOY, GLASS MANUFACTURING MEMBER USING THE NICKEL-BASED SELF-FLUXING ALLOY, AS WELL AS MOLD AND GLASS GOB TRANSPORTING MEMBER EACH USING THE GLASS MANUFACTURING MEMBER

(71) Applicants: TOYO SEIKAN GROUP HOLDINGS, LTD., Tokyo (JP); TOYO GLASS CO., LTD., Tokyo (JP)

(72) Inventors: Daisuke Kawamata, Kanagawa (JP); Toshifusa Azuma, Kanagawa (JP); Daichi Tsuchiya, Kanagawa (JP); Yutaka Asano, Kanagawa (JP); Yukio Satoh, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 17/613,412

(22) PCT Filed: May 19, 2020

(86) PCT No.: PCT/JP2020/019745
§ 371 (c)(1),
(2) Date: Nov. 22, 2021

(87) PCT Pub. No.: WO2020/235547
PCT Pub. Date: Nov. 26, 2020

(65) Prior Publication Data
US 2022/0251684 A1 Aug. 11, 2022

(30) Foreign Application Priority Data
May 23, 2019 (JP) .............................. JP2019-096985

(51) Int. Cl.
*C22C 19/03* (2006.01)
*C03B 9/48* (2006.01)
*C22C 19/05* (2006.01)

(52) U.S. Cl.
CPC ................. *C22C 19/03* (2013.01); *C03B 9/48* (2013.01); *C22C 19/05* (2013.01)

(58) Field of Classification Search
CPC ................................ C22C 19/05; C22C 19/03
See application file for complete search history.

(56) References Cited

U.S. PATENT DOCUMENTS

| 4,040,049 A | * | 8/1977 | Messerschmitt | ........ C22C 19/05 |
| 5,006,321 A | * | 4/1991 | Dorfman | ................. C23C 4/129 |
| | | | | 427/376.6 |

FOREIGN PATENT DOCUMENTS

| CN | 103998164 | 8/2014 |
| CN | 105779997 | 7/2016 |

(Continued)

OTHER PUBLICATIONS

PCT International Search Report (w/ English translation) for corresponding PCT Application No. PCT/JP2020/019745, dated Aug. 18, 2020, 4 pages.

(Continued)

*Primary Examiner* — Jessee R Roe
(74) *Attorney, Agent, or Firm* — Dority & Manning, PA

(57) ABSTRACT

The present invention relates to a nickel-based self-fluxing alloy, a glass manufacturing member, a mold, and a glass gob transporting member having an improved slipperiness against a glass gob. A nickel-based self-fluxing alloy used in a glass manufacturing member for transporting or molding glass with a viscosity of log η=3 to 14.6, comprises: boron (B) in an amount of ranging from 0 percent to 1.5 percent by mass; hard particles; and silicon (Si). Preferably, the amount of boron (B) ranges from 0 percent to less than 1.0 percent (Continued)

by mass. Preferably, the hard particles contain at least one of a carbide, a nitrides, an oxide and a cermet. Preferably, the nickel-based self-fluxing alloy comprises at least one metal selected from Group 4, 5 and 6 elements in an amount of ranging from 0 percent to 30 percent by mass.

28 Claims, 23 Drawing Sheets

(56) References Cited

FOREIGN PATENT DOCUMENTS

| EP | 2551368 | 1/2013 |
|----|---------|--------|
| JP | S33-4952 | 6/1955 |
| JP | 47-39208 | 12/1972 |
| JP | 47039208 | 12/1972 |
| JP | S61-49376 | 10/1986 |
| JP | H02229728 | 9/1990 |
| JP | H 08-311630 | 11/1996 |
| JP | 2005-146409 | 6/2005 |
| JP | 2008-201080 | 9/2008 |
| WO | WO 01/28942 | 4/2001 |
| WO | WO 2011/118576 | 7/2013 |

OTHER PUBLICATIONS

Chinese Office Action for corresponding Chinese Application No. CN202080036667.0, dated Aug. 26, 2022, 30 pages.
Guo, "Technical Manual of Mechanical Manufacturing Process Materials", vol. 1, retrieved from https://img.duxiu.com on Aug. 10, 2022, 4 pages.
Ma et al., "Oxyacetylene flame powder spray welding technology", Sichuan Provincial Economic Commission and Sichuan Provincial Heat Harvest Association, 1983, retrieved from https://img.duxiu.com on Aug. 10, 2022, 3 pages.
Qian, et al., "Welding Technical Manual", Shanxi Science & Technology Press, retrieved from https://img.duxiu.com on Aug. 10, 2022, 3 pages.
Wang, "Oxy-acetylene metal powder spray welding", Dec. 1986, retrieved from sslibrary.com, on Aug. 11, 2022, 3 pages.
Zhang, "Technical Manual of Railway Rolling Stock", Manufacturing Technology, vol. 3, 2002, 3 pages.
PCT international Search Report and Written Opinion (w/ English translation) for corresponding PCT Application No. PCT/JP2020/019745, dated Aug. 18, 2020, 12 pages.

\* cited by examiner

NICKEL-BASED SELF-FLUXING ALLOY, GLASS MANUFACTURING MEMBER USING THE NICKEL-BASED SELF-FLUXING ALLOY, AS WELL AS MOLD AND GLASS GOB TRANSPORTING MEMBER EACH USING THE GLASS MANUFACTURING MEMBER

CROSS REFERENCE TO RELATED APPLICATIONS

This application is the U.S. National Stage entry of International Application No. PCT/JP2020/019745 filed under the Patent Cooperation Treaty and having a filing date of May 19, 2020, which claims priority to Japanese Patent Application No. 2019-096985 having a filing date of May 23, 2019, both of which are incorporated herein by reference.

The present invention relates to a nickel-based self-fluxing alloy used in a glass manufacturing member for transporting or molding glass, and a glass manufacturing member using the Ni-based self-fluxing alloy, as well as a mold and a glass gob transporting member each using the glass manufacturing member.

In glass product molding processes, when a glass manufacturing member and glass heated to a high temperature tend to adhere to each other, molding defects such as inaccurate shaping of a product or formation of scratches on the surface of a glass product are likely to occur. For this reason, in the molding of glass bottles, for example, a mold release agent is frequently applied ("swabbing") to ensure mold release (See Patent Document 1, for example). As used herein, the term "molten glass" or "molten glass gob" refers to glass at a high temperature which allows molding and processing of the glass; that is glass (or glass gob) with a viscosity of log η=3 to 14.6 (=$10^3$ to $10^{14.6}$ poise), where log η represents the natural logarithm.

In addition, alloys containing a small amount of B (boron) have been proposed as a material used in a glass manufacturing member with excellent heat resistance and wear resistance (See Patent Document 2, for example).

Known technologies in the technical fields other than glass molding include forming a thermal-sprayed coating on the surface of a plunger, a hearth roll or other members to improve the wear resistance of the surface of the member. It has been proposed to use self-fluxing alloys that can create coatings which would not peel off even when subjected to rapid thermal changes, and that can be thermal splayed and then subjected to a fusing (re-melting) treatment to form a more homogeneous coating without pores. Known such self-fluxing alloys include one containing: Ni (nickel) in an amount of 40% to 70% m/m; Cr (chromium) in an amount of 5% to 40% m/m; B (boron) in an amount of 1% to 6% m/m; Si (silicon) in an amount of 1% to 6% m/m; C (carbon) in an amount of 0.1% to 2.0% m/m; F (iron) in an amount of 1% to 10% m/m; W (tungsten) in an amount of 1% to 20% m/m; and Cu (copper) in an amount of 0.8% to 5% m/m (See Patent Document 3, for example).
Patent Document 1: WO01/28942A1
Patent Document 2: JPS33-4952B2
Patent Document 3: JPS61-49376B2

SUMMARY OF THE INVENTION

Task to be Accomplished by the Invention

The properties required for glass manufacturing members that come into contact with a molten glass gob in glass product molding processes include: adequate non-adherence to a molten glass gob; absence of unintended holes (such as pinholes) on their surfaces; good wear resistance; and longer life. However, glass manufacturing members of the prior art still do not adequately satisfy these requirements for the properties.

The present invention has been made in view of this problem of the prior art, and a primary object of the present invention is to provide a nickel-based self-fluxing alloy with high wear resistance and low adhesion to molten glass, and a glass manufacturing member using the nickel-based self-fluxing alloy, as well as a mold and a glass gob transporting member each using the glass manufacturing member.

Means to Accomplish the Task

An aspect of the present invention provides a nickel-based self-fluxing alloy comprising: B (boron) in an amount of ranging from 0 percent to 1.5 percent by mass; hard particles; and Si (silicon), and a glass manufacturing member using the nickel-based self-fluxing alloy. Another aspect of the present invention provides a mold and a glass gob transporting member each using a glass manufacturing member, the glass manufacturing member having a contact part to be in contact with molten glass in a glass molding process, wherein the contact part is made of the nickel-based self-fluxing alloy.

Effect of the Invention

A nickel-based self-fluxing alloy according to the present invention is hard to adhere to molten glass even at high temperatures. Thus, when a glass manufacturing member in which the alloy is entirely or partly used comes into contact with molten glass, the alloy reduces friction between the glass manufacturing member and molten glass, thereby reducing the necessity of swabbing treatment and minimizing the defects in resulting products, which improves the production yield.

DESCRIPTION OF THE PREFERRED EMBODIMENT(S)

The present invention is based primarily on the inventors' discovery that a certain alloy composition including a predetermined amount of B (boron) or not including B, does not adhere to molten glass even at a high temperature. The present invention can improve the slipperiness of a molten glass gob on the surface of the nickel-based self-fluxing alloy.

Figure 1:
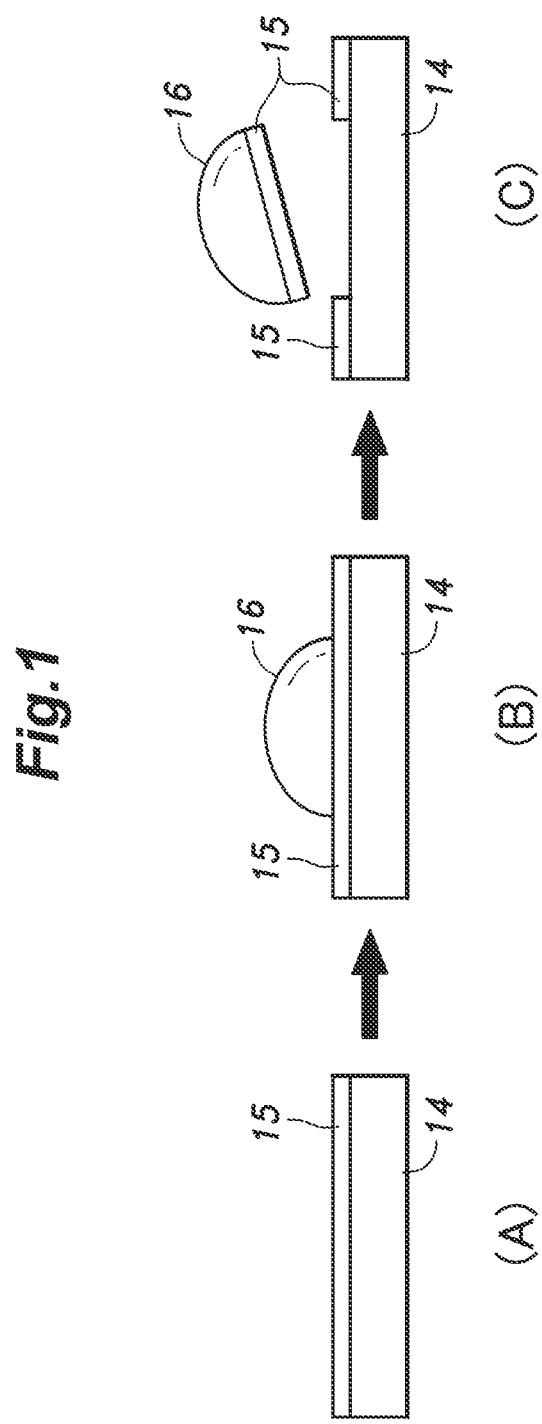
FIG. 1 is a schematic diagram of a phenomenon that occurs when a molten glass gob collides with a metal material or a glass manufacturing member.
Figure 2:
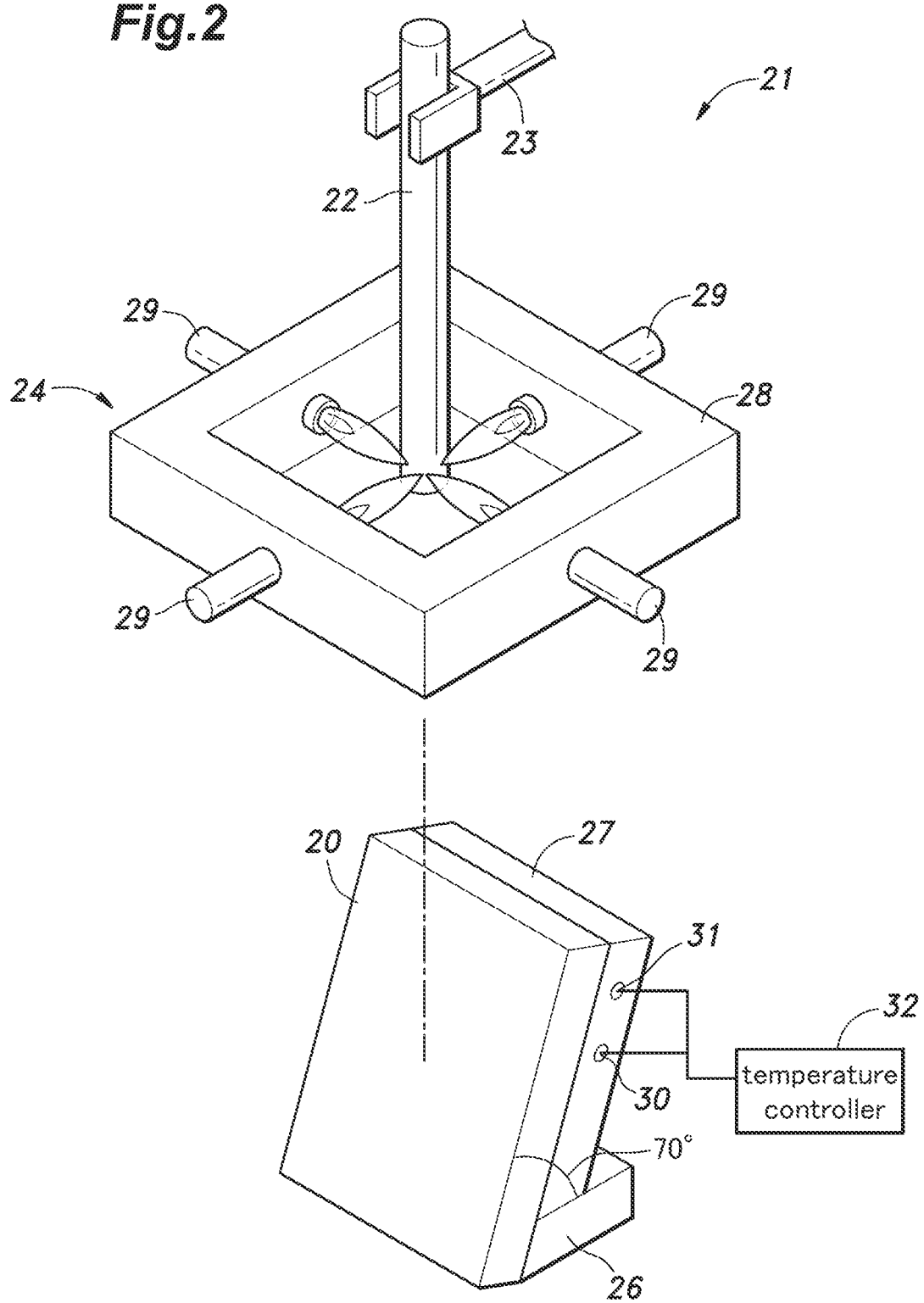
FIG. 2 is a perspective view of a molten glass adhesion testing device.
Figure 3:
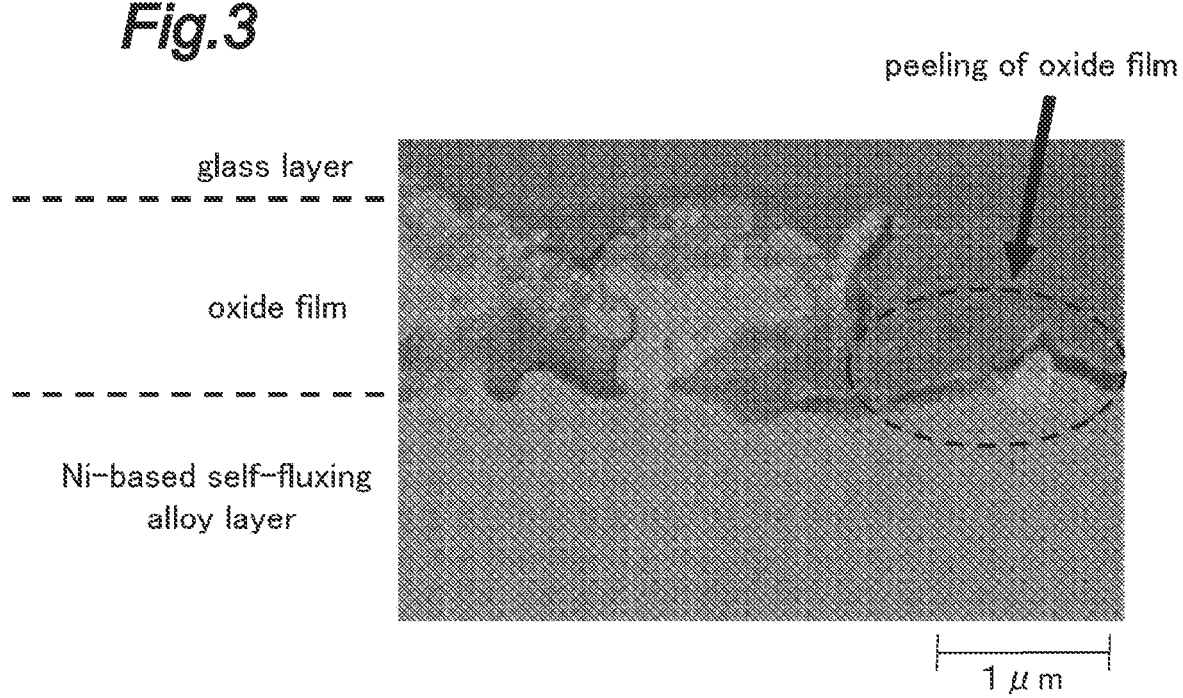
FIG. 3 is an electron microscope image of a cross section of an interface where glass adheres to a sample in Example 4.

The mechanism behind the findings of the inventors is inferred as follows: FIG. 3 is an electron microscope image of a cross section of an interface where a molten glass gob adheres to a nickel-based self-fluxing alloy (Example 4) of the present invention. A molten glass adhesion testing device (FIG. 2) as described later was used to acquire the image in the figure. Specifically, molten glass at 1050° C. was dropped on a surface of each sample 20 heated to 750° C., and then the sample 20 and the molten glass were cooled so that the glass adheres to a the surface of the sample 20. After the surfaces of the glass and that of the sample 20 were covered with a resin material, the sample, glass and resin were cut along a plane orthogonal to the surface of the sample so as to expose the cross section. Then, the exposed cross section was subjected to a smoothing treatment by ion milling. The cross-sectional image of FIG. 3 shows that a gap is formed between the oxide film formed on the surface of a base material of the Ni-based self-fluxing alloy and the base material, which suggests that, as schematically shown in FIG. 1, a metal oxide film 15 formed on the surface of a metal material 14 of a nickel-based self-fluxing alloy of the present invention can be easily peeled off from the base material (the metal material 14) together with a molten glass gob 16. While not being held to any specific theory, it is presumed that the oxide film of the Ni-based self-fluxing alloy of the present invention is more easily peeled off because of a metal of Groups 4, 5 and 6. It is thought that, due to the difference in the coefficient of thermal expansion from that of the Ni-based self-fluxing alloy, when the temperature is increased, the oxide films of metals of Groups 4, 5 and 6 are easily peeled off from the Ni-based self-fluxing alloy. Thus, as shown in FIGS. 1 (B) and 1 (C), the metal oxide film 15 of Groups 4, 5 and 6 adheres to the molten glass gob 16 when the films come into contact with the molten glass gob 16, and is peeled off from the metal material 14 (base material) of the Ni-based self-fluxing alloy. This is thought to be how the slipperiness of the Ni-based self-fluxing alloy against a glass gob is improved. After the oxide film is peeled off, the oxide film is thought to be quickly regenerated; that is, the state shown in FIG. 1(C) quickly returns to that shown in FIG. 1 (A), resulting in that the Ni-based self-fluxing alloy can exhibit high slipperiness to a molten glass gob for a long period of time.

Generally, Ni is known to have lower adhesion to glass than other metal materials. It is also known that a nickel-based alloy which contains B (boron) may have high adhesion to a molten glass gob; that is, a level of slipperiness of a molten glass gob is decreased on the surface of the metal material including B (boron). While not being held to any specific theory, it is presumed that B in the Ni-based alloy or $B_2O_3$ occurring on the surface of the Ni-based alloy at high temperatures improves the adhesion of the Ni alloy oxide to the base metal, or the mixed oxide of B and Ni alloy is hardly peeled off from the base metal, which is thought to prevent the above-described phenomenon of peeling of the oxide film, resulting in that the oxide film firmly adheres to the surface of the Ni alloy firmly adheres, decreasing the slipperiness of a molten glass gob on the Ni-based alloy.

According to the present embodiment, the Ni-based self-fluxing alloy used in a glass manufacturing member for molding glass with a viscosity of log η=3 to 14.6, comprises B (boron) in an amount of ranging from 0 percent to 1.5 percent by mass; hard particles; and Si (silicon). The glass manufacturing member comprises a glass molding member, and a glass transporting member. The expression "log η" represents the natural logarithm. The amount of each of the components contained in the Ni-based self-fluxing alloy according to the present embodiment is preferably in the range described later. Examples of the type of glass include soda-lime glass, and borosilicate glass, lead glass. The glass manufacturing member may be a member for transporting or molding glass at temperatures of ranging from 400 to 1400° C.

According to the present embodiment, the Ni-based self-fluxing alloy contains B (boron) in an amount of ranging from 0 percent to less than 1.5 percent by mass. The Ni-based self-fluxing alloy may contain B (boron) in an amount of ranging from 0 percent to 1.1 percent by mass, preferably in an amount of ranging from 0 percent to less than 1.0 percent by mass, more preferably in an amount of ranging from 0 percent to less than 0.75 percent by mass, most preferably in an amount of ranging from 0 percent to less than 0.5 percent by mass. Furthermore, the Ni-based self-fluxing alloy may contain B (boron) in an amount of ranging from more than 0 percent to less than 1.0 percent by mass, preferably in an amount of ranging from more than 0 percent to less than 0.75 percent by mass, most preferably in an amount of more than 0 percent to less than 0.5 percent by mass. In other embodiment the Ni-based self-fluxing alloy does not contain B (boron).

The Ni-based self-fluxing alloy may contain Si (silicon) preferably in an amount of ranging from 0 percent to 10 percent by mass, more preferably in an amount of ranging from 1.0 percent to 7.5 percent by mass.

B and Si are flux components, and the self-fluxing property of the Ni-based self-fluxing alloy increases with an increasing amount of these components. B and Si form $B_2O_3$ and $SiO_2$ oxide films on the surface of the Ni-based self-fluxing alloy. As described above, $B_2O_3$ can be one of the factors for increasing the adhesiveness to molten glass. Thus, in the present embodiment, the Ni-based self-fluxing alloy containing a smaller amount of B is more preferable.

The Ni-based self-fluxing alloy according to the present embodiment contains hard particles in order to improve wear resistance. Examples of the hard particles include carbides, nitrides, oxides and cermet materials (i.e., composite materials composed of carbides, nitrides, or oxides in combination with metal materials). The Ni-based self-fluxing alloy according to the present embodiment contains at least one of a carbide, a nitride, an oxide and a cermet. The Ni-based self-fluxing alloy comprises hard particles in an amount of 0 percent to 50 percent by mass, preferably in an amount of 5 percent to 50 percent by mass, more preferably in an amount of 5 percent to 30 percent by mass. When containing too small an amount of hard particles, the Ni-based self-fluxing alloy does not have sufficient wear resistance and goes unusable in a short time period. When containing too large an amount of hard particles, the Ni-based self-fluxing alloy becomes difficult to be processed into a member(s).

Carbides as hard particles comprise any one of the elements of Groups 4, 5 and 6 (of the Periodic Table). Examples of such carbides include: TiC (titanium carbides); ZrC (zirconium carbides); HfC (hafnium carbides); VC or $V_2C$ (vanadium carbides); NbC (niobium carbides); TaC (tantalum carbides); $Cr_3C_2$, $Cr_7C_3$ or $Cr_{23}C_6$ (chromium carbides); $Mo_2C$ (molybdenum carbides); and WC or $W_2C$ (tungsten carbides).

Carbides as hard particles may include silicon carbide.

Oxides as hard particles may include at least one selected from lanthanide metal oxides. The at least one selected from lanthanide metal oxides is preferably cerium oxide.

The cermet may comprise a carbide of any one of the Group 4, 5 and 6 elements. The cermet which is a composite material composed of the carbide and a metal material, is preferably, but is not limited to, WC (WC-12% Co) containing 12% m/m Co (cobalt) as a binder.

The hard particles disperse in the base material, the Ni-based self-fluxing alloy, improving the wear resistance of the alloy, which means that a glass manufacturing member using the Ni-based self-fluxing alloy exhibits long-term durability.

The Ni-based self-fluxing alloy may comprise the at least one metal selected from Group 15 elements, preferably in an amount of ranging from 0 percent to 15 percent by mass. The at least one metal selected from Group 15 elements is preferably P (phosphorus).

The Ni-based self-fluxing alloy according to the present embodiment may contain P (phosphorus) in an amount of ranging from 0 percent to 5 percent by mass, preferably in an amount of ranging from 0.5 percent to 4 percent by mass.

The Ni-based self-fluxing alloy according to the present embodiment may contain at least one metal selected from Group 4, 5 and 6 elements in an amount of ranging from 0 percent to 30 percent by mass, preferably in an amount of ranging from 2.5 percent to 30 percent by mass. The at least one metal selected from Group 4, 5 and 6 elements is preferably Cr (chromium), and the amount of Cr (chromium) preferably ranges from 2.5 percent to 30 percent by mass.

The Ni-based self-fluxing alloy according to the present embodiment may contain at least one metal selected from Group 3 elements, preferably in an amount of ranging from 0 percent to 10 percent by mass. The at least one metal selected from Group 3 elements is preferably Y (yttrium).

The Ni-based self-fluxing alloy according to the present embodiment may contain at least one metal selected from Group 7 elements, preferably in an amount of ranging from 0 percent to 10 percent by mass. The at least one metal selected from Group 7 elements is preferably Mn (manganese) or Re (rhenium).

The Ni-based self-fluxing alloy according to the present embodiment may contain at least one metal selected from Group 8 elements, preferably in an amount of ranging from 0 percent to 30 percent by mass. The at least one metal selected from Group 8 elements is preferably Fe (iron).

The Ni-based self-fluxing alloy according to the present embodiment may contain at least one metal selected from Group 11 elements, preferably in an amount of ranging from 0 percent to 10 percent by mass. The at least one metal selected from Group 11 elements is preferably Cu (copper) or Ag (silver).

The Ni-based self-fluxing alloy according to the present embodiment may contain the balance nickel in an amount ranging from 3.5 percent to 97.5 percent by mass, and other incidental process impurities in a small amount.

The metal components other than hard particles of the Ni-based self-fluxing alloy according to the present embodiment may be prepared by using any preparation scheme as long as the resulting alloy has a composition within the prescribed scope. For example, the Ni-based self-fluxing alloy may be prepared by melting and mixing metals comprising essential components and an inorganic compound(s) and then solidifying them to produce alloy, or only by mixing fine particles of metals comprising essential components with those of an inorganic compound(s).

Examples of methods for producing glass manufacturing members using the Ni-based self-fluxing alloy of the present invention include, but are not limited to, sintering or casting.

One example of a method of applying the Ni-based self-fluxing alloy only to a contact part, which is to be in contact with molten glass, of a mold and/or a molten glass gob transporting member both made of a metal such as iron, involves coating the contact part with a film made of Ni-based self-fluxing alloy by thermal spraying, plating, cladding, laminated molding, welding, or any other suitable method. Moreover, the method may further comprise, subsequent to forming the film, subjecting the film to a fusing (re-melting) treatment to thereby close the pores in the film and improve the adhesion between the film and the base material.

Figure 4:
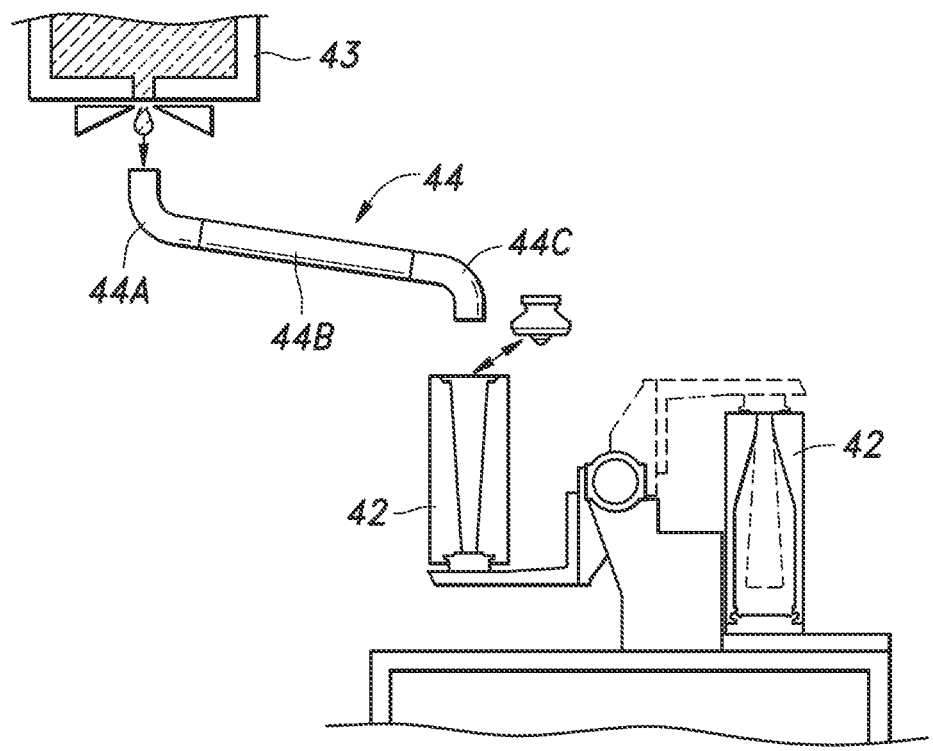
FIG. 4 is an explanatory drawing showing a mold and a glass transporting member.

Examples of glass manufacturing members will be described. As shown in FIG. 4, examples of glass manufacturing members include a mold 42 for molding a glass bottle used to mold glass bottles from molten glass, and a glass gob transporting member 44 for transporting molten glass gob supplied from a molten glass tank 43 to the mold 42. The mold 42 includes a rough mold for molding a parison from a molten glass gob, a baffle, a mouth mold, a plunger, and a finishing mold for molding a glass bottle from the parison. The glass gob transporting member 44 includes a shooter, a gutter and other parts for transporting a glass gob to the rough mold. The glass gob transporting member 44 includes a scoop 44A, a trough 44B, and a deflector 44C. When manufacturing the mold 42 and the glass gob transporting member 44, an entirety of each member may be formed of the Ni-based self-fluxing alloy, or only a contact part, which is to be in contact with a glass gob, of each member may be provided with a film of the Ni-based self-fluxing alloy.

In the above-described embodiments, the Ni-based self-fluxing alloy has characteristics such that, when the Ni-based self-fluxing alloy is formed into a plate, heated to 480° C. and placed to be inclined at 70 degrees with respect to the horizontal, and 0.3 g of molten glass heated to 1,000° C. is dropped onto the heated plate of the Ni-based self-fluxing alloy, the molten glass slides down without adhering to the plate of the Ni-based self-fluxing alloy.

Thus, according to the above-described embodiments, a Ni-based self-fluxing alloy which does not adhere to a molten glass gob even at a high temperature can be provided. Furthermore, provided by applying the Ni-based self-fluxing alloy to various glass molding members are various glass manufacturing members which have an improved slipperiness against a glass gob and do not adhere to a molten glass gob or flat glass. Examples of such glass manufacturing members include molds for press molding, molding rolls, transfer rolls, and transfer molds, and jigs which come into contact with glass.

EXAMPLES (Molten Glass Adhesion Testing Device)

A molten glass adhesion testing device 21 (FIG. 2) for evaluating the adhesion (adhesiveness) between molten glass and a metal will be described. A device used in the examples was a testing device 21 provided with a glass rod holder 23 for supporting a glass rod 22, a glass rod heating device 24 for heating the lower end of the glass rod 22, a sample holder 26 for supporting a sample 20 at a predetermined angle beneath the glass rod heating device 24, and a sample heating device 27 for heating the sample 20.

The sample 20 was placed to be inclined at 70 degrees with respect to the horizontal, such that the central portion of the sample was located below the center point A of a rectangular burner support frame 28 at a distance of 100 mm. Furthermore, the sample heating device 27 was a metal plate provided with a heater 30 and a thermocouple 31 both connected to a temperature controller 32.

The glass rod heating device 24 was provided with the rectangular frame 28 and four burners 29 supported by the frame 28. The burners 29 were supported by the frame 28 so that their injection holes face the inside of the frame 28 and the respective injection axes intersect at the center point A of the frame 28. The burners 29 were adjusted so that the tips of the respective flames ejected from the burners 29 intersected at the center point A of the frame 28.

(Glass Bar)

The glass rod 22 was made of glass having the composition comprising: $SiO_2$ in an amount of 69% m/m; $Al_2O_3$ in an amount of 1.7% m/m; $Fe_2O_3$ in an amount of 0.06% m/m; Na2O in an amount of 8.5% m/m; $K_2O$ in an amount of 4.9% m/m; MgO in an amount of 2.2% m/m; CaO in an amount of 4.0% m/m; SrO in an amount of 6.0% m/m; BaO in an amount of 3.2% mm; $Sb_2O_3$ in an amount of 0.3% mm; $P_2O_5$ in an amount of 0.2% m/m; $TiO_2$ in an amount of 0.03% m/m; Cl in an amount of 0.03% m/m; $SO_3$ in an amount of 0.03% m/m; and $ZrO_2$ in an amount of 0.1% by m/m. The diameter of the glass rod was 4 mm.

(Test Method)

After a surface temperature of a sample 20 was confirmed to be at a predetermined temperature by measuring the sample with a temperature sensor (Anritsu Meter Co., Ltd., Static surface temperature sensor, Model A series), the lower end of the glass rod 22 was disposed at the center point A of the frame 28, and heated by the flames ejected from the burners 29. The lower end of the heated glass rod melted into a spherical shape and naturally dropped onto the sample 20. The temperature of the glass gob at the time of dropping onto the sample was measured by thermography (Shinano Kenshi Co., Ltd., PLEXLOGGER PL3).

(Method for Measuring Adhesion Rate)

In the test, a glass gob dropped onto the sample 20 adheres to the sample 20 or falls downward without adhering thereto. When the temperature of a glass gob at the time of dropping onto the sample 20 was within the range of 1000 (±20)° C., it was determined whether the glass gob adhered to the surface of the sample 20 or fell downward without adhering thereto; that is, it was determined whether the test result was "adhesion" or "non-adhesion." This test was carried out 10 times at a certain temperature of the surface of the sample 20, and an adhesion rate (%) was calculated as the ratio of the number of the "adhesion" results to all the 10 test results. When the temperature of a glass gob dropped onto the sample did not fall within the prescribed range, the determination result was not counted as a test result for adhesion rate.

Samples of Examples 1 to 48 and Comparative Examples 1 to 5 were prepared by the methods shown below and their adhesion properties were evaluated. Tables 1 to 15 show compositions (ratios of components), production methods, and adhesion test results of Examples 1 to 48 and Comparative Examples 1 to 5.

TABLE 1

Components, Production Method, Test Results of Self-fluxing Alloys of Examples 1 to 13 and Comparative Examples 1 to 2

| | components (% m/m) | | | | | | | | | | | molten glass adhesion test result | | |
|---|---|---|---|---|---|---|---|---|---|---|---|---|---|---|
| | | | | | | | | | WC 12% | WC fine | | surface temp. (° C.) | | |
| | | | | | | Ni | | | Co | | | | | |
| SPLE | B | Si | P | Cr | Co | (bal) | Mo | V | ptcls | pm | * | 480 | 500 | 520 |
| EX 1 | 0 | 5 | 1.6 | 4.5 | 0 | 71.2 | 2 | 0 | 15.7 | 0 | st | ✓ | ✓ | ✓ |
| EX 2 | 0.1 | 5 | 1.6 | 4.5 | 0 | 71.1 | 2 | 0 | 15.7 | 0 | st | ✓ | ✓ | ✓ |
| EX 3 | 0.5 | 5 | 1.6 | 4.5 | 0 | 70.7 | 2 | 0 | 15.7 | 0 | st | ✓ | ✓ | ✓ |
| EX 4 | 1.1 | 2.5 | 1.6 | 4.5 | 0 | 72.6 | 2 | 0 | 15.7 | 0 | st | ✓ | ✓ | ✓ |
| EX 5 | 0 | 1 | 1.6 | 4.5 | 0 | 75.2 | 2 | 0 | 15.7 | 0 | st | ✓ | ✓ | ✓ |
| EX 6 | 0 | 2.5 | 1.6 | 4.5 | 0 | 73.7 | 2 | 0 | 15.7 | 0 | st | ✓ | ✓ | ✓ |
| EX 7 | 1.1 | 2.5 | 1.6 | 0 | 0 | 77.1 | 2 | 0 | 15.7 | 0 | st | ✓ | X | X |
| EX 8 | 1.1 | 2.5 | 1.6 | 20 | 0 | 57.1 | 2 | 0 | 15.7 | 0 | st | ✓ | ✓ | ✓ |
| EX 9 | 1.1 | 2.5 | 1.6 | 4.5 | 0 | 74.6 | 0 | 0 | 15.7 | 0 | st | ✓ | ✓ | ✓ |
| EX10 | 1.1 | 2.5 | 1.6 | 4.5 | 0 | 74.2 | 0 | 0.4 | 15.7 | 0 | st | ✓ | ✓ | ✓ |
| EX11 | 0 | 5 | 1.6 | 4.5 | 1.88 | 71.2 | 2 | 0 | 0 | 13.82 | st | ✓ | ✓ | ✓ |
| EX12 | 0 | 5 | 1.6 | 4.5 | 0 | 73.08 | 2 | 0 | 0 | 13.82 | st | ✓ | ✓ | ✓ |

TABLE 1-continued

Components, Production Method, Test Results of Self-fluxing Alloys of Examples 1 to 13 and Comparative Examples 1 to 2

| | components (% m/m) | | | | | | | | | | | | molten glass adhesion test result | | |
|---|---|---|---|---|---|---|---|---|---|---|---|---|---|---|---|
| | | | | | | | | | | WC | WC | | surface temp. (° C.) | | |
| | | | | | | | Ni | | | 12% | fine | * | | | |
| SPLE | B | Si | P | Cr | Co | (bal) | Mo | V | Co | ptcls | pm | 480 | 500 | 520 |
| EX13 | 0 | 5 | 1.6 | 4.5 | 0 | 71.2 | 2 | 0 | 15.7 | 0 | st | ✓ | ✓ | ✓ |
| CE 1 | 5 | 5 | 1.6 | 4.5 | 0 | 66.2 | 2 | 0 | 15.7 | 0 | st | X | X | X |
| CE 2 | 5 | 0 | 1.6 | 4.5 | 0 | 71. | 2 | 0 | 15.7 | 0 | st | X | X | X |

* pm: production method, st: sintering

TABLE 2

Components, Production Method, Test Results of Self-fluxing Alloys of Examples 14 to 16

| | components (% m/m) | | | | | | | | | | molten glass adhesion test result surface temp. (° C.) | | |
|---|---|---|---|---|---|---|---|---|---|---|---|---|---|
| | | | | | Ni | | | | | * | | | |
| SPLE | B | Si | P | Cr | (bal) | Mo | CrC | VC | ZrC | pm | 480 | 500 | 520 |
| EX14 | 0 | 5 | 1.6 | 4.5 | 71.2 | 2 | 15.7 | 0 | 0 | st | ✓ | ✓ | ✓ |
| EX15 | 0 | 5 | 1.6 | 4.5 | 71.2 | 2 | 0 | 15.7 | 0 | st | ✓ | ✓ | ✓ |
| EX16 | 1.1 | 2.5 | 1.6 | 4.5 | 72.6 | 2 | 0 | 0 | 15.7 | st | ✓ | ✓ | X |

* pm: production method, st: sintering

TABLE 3

Components, Production Method, Test Results of Self-fluxing Alloy of Example 17

| | components (% m/m) | | | | | | | | molten glass adhesion test result surface temp. (° C.) | | |
|---|---|---|---|---|---|---|---|---|---|---|---|
| | | | | | Ni | | | | | | |
| SPLE | B | Si | P | Cr | (bal) | Mo | SiC | prod. method | 450 | 500 | 520 |
| EX17 | 0 | 5 | 1.6 | 4.5 | 7.12 | 2 | 5 | sintering | ✓ | ✓ | ✓ |

TABLE 4

Components, Production Method, Test Results of Self-fluxing Alloys of Examples 18 to 20

| | components (% m/m) | | | | | | | | | | molten glass adhesion test result | | |
|---|---|---|---|---|---|---|---|---|---|---|---|---|---|
| | | | | | | | | WC 10% | WC- | | surface temp. (° C.) | | |
| | | | | | Ni | | | Co, | WC- | | | | |
| SPLE | B | Si | P | Cr | (bal) | Mo | Ni | Cr | CrNi | *pm | 480 | 500 | 520 |
| EX18 | 1.1 | 2.5 | 1.6 | 4.5 | 72.6 | 2 | 15.7 | 0 | 0 | st | ✓ | ✓ | ✓ |
| EX19 | 1.1 | 2.5 | 1.6 | 4.5 | 72.6 | 2 | 0 | 15.7 | 0 | st | ✓ | ✓ | X |
| EX20 | 1.1 | 2.5 | 1.6 | 4.5 | 72.6 | 2 | 0 | 0 | 15.7 | st | ✓ | ✓ | X |

*pm: production method,
st: sintering

TABLE 5

Components, Production Method, Test Results of Self-fluxing Alloys of Examples 21 to 23

| | components (% m/m) | | | | | | | | molten glass adhesion test result surface temp. (° C.) | | |
|---|---|---|---|---|---|---|---|---|---|---|---|
| SPLE | B | Si | P | Cr | Ni (bal) | Mo | WC 25% NiCr | prod. method | 480 | 500 | 520 |
| EX21 | 0 | 5 | 1.6 | 4.5 | 80.2 | 2 | 6.7 | sintering | ✓ | ✓ | ✓ |
| EX22 | 0 | 5 | 1.6 | 4.5 | 71.2 | 2 | 15.7 | sintering | ✓ | ✓ | ✓ |
| EX23 | 1.1 | 2.5 | 1.6 | 4.5 | 72.6 | 2 | 15.7 | sintering | ✓ | ✓ | ✓ |

TABLE 6

Components, Production Method, Test Results of Self-fluxing Alloys of Examples 24 to 32

| | components (% m/m) | | | | | | | | | | | | | | molten glass adhesion test result surface temp. (° C.) | | |
|---|---|---|---|---|---|---|---|---|---|---|---|---|---|---|---|---|---|
| SPLE | B | Si | P | Cr | Ni (bal) | Mo | WC 12% Co | Ti | V | Zr | Ta | W | * pm | 480 | 500 | 520 | |
| EX24 | 1.1 | 2.5 | 1.6 | 0 | 74.1 | 0 | 15.7 | 5 | 0 | 0 | 0 | 0 | st | ✓ | X | X | |
| EX25 | 1.1 | 2.5 | 1.6 | 0 | 69.1 | 0 | 15.7 | 0 | 0 | 10 | 0 | 0 | st | ✓ | ✓ | ✓ | |
| EX26 | 1.1 | 2.5 | 1.6 | 0 | 74.1 | 5 | 15.7 | 0 | 0 | 0 | 0 | 0 | st | ✓ | ✓ | X | |
| EX27 | 1.1 | 2.5 | 1.6 | 0 | 69.1 | 10 | 15.7 | 0 | 0 | 0 | 0 | 0 | st | ✓ | X | X | |
| EX28 | 1.1 | 2.5 | 1.6 | 0 | 69.1 | 0 | 15.7 | 0 | 0 | 0 | 10 | 0 | st | ✓ | ✓ | ✓ | |
| EX29 | 0 | 5 | 1.6 | 4.5 | 66.2 | 2 | 15.7 | 0 | 5 | 0 | 0 | 0 | st | ✓ | ✓ | ✓ | |
| EX30 | 1.1 | 2.5 | 1.6 | 4.5 | 67.6 | 2 | 15.7 | 0 | 5 | 0 | 0 | 0 | st | ✓ | ✓ | ✓ | |
| EX31 | 0 | 5 | 1.6 | 4.5 | 58.2 | 2 | 15.7 | 0 | 3 | 10 | 0 | 0 | st | ✓ | ✓ | ✓ | |
| EX32 | 1.1 | 2.5 | 1.6 | 4.5 | 62.2 | 2 | 15.7 | 0 | 0 | 0 | 0 | 10 | st | ✓ | ✓ | ✓ | |

* pm: production method, st: sintering

TABLE 7

Components, Production Method, Test Results of Self-fluxing Alloys of Examples 33 to 34

| | components (% m/m) | | | | | | | | | molten glass adhesion test result surface temp. (° C.) | | |
|---|---|---|---|---|---|---|---|---|---|---|---|---|
| SPLE | B | Si | P | Cr | Co | Ni (bal) | Mo | WC-25% Co cermet | prod method | 480 | 500 | 520 |
| EX33 | 1.1 | 2.5 | 1.6 | 4.5 | 0 | 83.4 | 2 | 5 | sintering | ✓ | ✓ | ✓ |
| EX34 | 1.1 | 2.5 | 1 6 | 4.5 | 0 | 68.4 | 2 | 20 | sintertng | ✓ | ✓ | ✓ |

TABLE 8

Components, Production Method, Test Results of Self-fluxing-Alloys of Examples 35 to 39

| | components (% m/m) | | | | | | | | | prod. method | molten glass adhesion test result surface temp. (° C.) | | |
|---|---|---|---|---|---|---|---|---|---|---|---|---|---|
| SPLE | B | Si | P | Cr | Ni (bal) | Mo | WC-12% Co crmt | Sb | Bi | | 480 | 500 | 520 |
| EX35 | 0 | 5 | 0 | 4.5 | 72.8 | 2 | 15.7 | 0 | 0 | sintering | ✓ | ✓ | ✓ |
| EX36 | 0 | 5 | 3 | 4.5 | 69.8 | 2 | 15.7 | 0 | 0 | sintering | ✓ | ✓ | ✓ |
| EX37 | 0 | 5 | 5 | 4.5 | 67.8 | 2 | 15.7 | 0 | 0 | sintering | ✓ | ✓ | ✓ |
| EX38 | 1.1 | 2.5 | 1.6 | 4.5 | 62.6 | 2 | 15.7 | 10 | 0 | sintering | ✓ | ✓ | ✓ |
| EX39 | 1.1 | 2.5 | 0 | 4.5 | 69.3 | 2 | 15.7 | 0 | 5 | sintering | ✓ | ✓ | ✓ |

*pm: production method,
st: sintering

TABLE 9

Components, Production Method, Test Results of Self-fluxing Alloy of Example 40

| | components (% m/m) | | | | | | | | | molten glass adhesion test result surface temp. (° C.) | | |
|---|---|---|---|---|---|---|---|---|---|---|---|---|
| SPLE | B | Si | P | Cr | Ni (bal) | Mo | WC-12% Co cermet | CeO$_2$ fine ptcls | *pm | 480 | 500 | 520 |
| EX40 | 1.1 | 2.5 | 1.6 | 4.5 | 62.6 | 2 | 15.7 | 10 | st | ✓ | ✓ | ✓ |

*pm: production method,
st: sintering

TABLE 10

Components, Production Method, Test Results of Self-fluxing Alloys of Examples 41 to 42

| | components (% m/m) | | | | | | | | | molten glass adhesion test result surface temp. (° C.) | | |
|---|---|---|---|---|---|---|---|---|---|---|---|---|
| SPLE | B | Si | P | Cr | Ni (bal) | Mo | WC-12% Co cermet | Y | *pm | 480 | 500 | 520 |
| EX41 | 1.1 | 2.5 | 1.6 | 4.5 | 71.5 | 2 | 15.7 | 1.11 | st | ✓ | ✓ | ✓ |
| EX42 | 1.1 | 2.5 | 1.6 | 4.5 | 62.7 | 2 | 15.7 | 10 | st | ✓ | X | X |

*pm: production method, st: sintering

TABLE 11

Components, Production Method, Test Results of Self-fluxing Alloys of Examples 43 to 44

| | components (% m/m) | | | | | | | | | | molten glass adhesion test result surface temp. (° C.) | | |
|---|---|---|---|---|---|---|---|---|---|---|---|---|---|
| SPLE | B | Si | P | Cr | Ni (bal) | Mo | WC-12% Co crmt | Mn | Re | *pm | 480 | 500 | 520 |
| EX43 | 1.1 | 2.5 | 1.6 | 0 | 72.1 | 2 | 15.7 | 5 | 0 | st | ✓ | ✓ | ✓ |
| EX44 | 1.1 | 2.5 | 1.6 | 0 | 67.1 | 2 | 15.7 | 0 | 10 | st | ✓ | ✓ | X |

*pm: production method, st: sintering

TABLE 12

Components, Production Method, Test Results of Self-fluxing Alloy of Example 45

| | components (% m/m) | | | | | | | | prod. method | molten glass adhesion test result surface temp. (° C.) | | |
|---|---|---|---|---|---|---|---|---|---|---|---|---|
| SPLE | B | Si | P | Cr | Ni (bal) | Mo | WC-12% Co cermet | Fe | | 480 | 500 | 520 |
| EX45 | 0 | 4 | 1.28 | 3.6 | 57.0 | 2 | 15.7 | 20 | sintering | ✓ | ✓ | ✓ |

TABLE 13

Components, Production Method, Test Results of Self-fluxing Alloys of Examples 46 to 47

| | components (% m/m) | | | | | | | | | | molten glass adhesion test result surface temp. (° C.) | | |
|---|---|---|---|---|---|---|---|---|---|---|---|---|---|
| SPLE | B | Si | P | Cr | Ni (bal) | Mo | WC-12% Co cermet | Cu | Ag | *pm | 480 | 500 | 520 |
| EX46 | 1.1 | 2.5 | 1.6 | 4.5 | 71.5 | 2 | 15.7 | 5 | 0 | st | ✓ | ✓ | ✓ |
| EX47 | 1.1 | 2.5 | 1.6 | 4.5 | 62.7 | 2 | 15.7 | 0 | 1.34 | st | ✓ | ✓ | ✓ |

*pm: production method, st: sintering

TABLE 14

Components, Production Method, Test Results of Self-fluxing Alloy of Example 48

| | components (% m/m) | | prod. method | molten glass adhesion test result surface temp. (° C.) | | |
|---|---|---|---|---|---|---|
| SPLE | Powder for thermal spraying in Table 16 | WC-12% Co cermet | | 480 | 500 | 520 |
| EX48 | 84.3 | 15.7 | thermal spraying | ✓ | ✓ | ✓ |

TABLE 15

Components, Production Method, Test Results of
Self-fluxing Alloys of Comparative Examples 3 to 5

| | components (% m/m) | | | | | | | | WC-12%Co cermet | WC fine ptcls | prod. method | molten glass adhesion test result surface temp. (° C.) | | |
|---|---|---|---|---|---|---|---|---|---|---|---|---|---|---|
| SPLE | B | Si | P | Cr | Co | Ni (bal) | Mo | V | | | | 480 | 500 | 520 |
| CE3 | 0 | 0 | 0 | 4.5 | 0 | 77.8 | 2 | 0 | 15.7 | 0 | sintering | X | X | X |
| CE4 | 5 | 0 | 0 | 4.5 | 0 | 72.8 | 2 | 0 | 15.7 | 0 | sintering | X | X | X |
| CE5 | 5 | 0 | 3 | 4.5 | 0 | 69.8 | 2 | 0 | 15.7 | 0 | sintering | X | X | X |

Example 1

Raw materials of Ni-based allow comprised of Si with a particle size (particle diameter) of 105 μm or less, Ni$_2$P with a particle size of 150 μm or less. Cr with a particle size of 63 μm or less, the balance Ni with a particle size of 2 to 3 μm, and Mo powder with a particle size of about 1.5 μm or less (both available from Kojundo Chemical Lab. Co., Ltd.), and WC-12% Co with a particle size of 15-45 μm (Eutectic Japan Ltd.) as hard particles were mixed at the ratios shown in Table 1, to thereby produce the alloy. After a plate of the alloy was produced by a pulse energization sintering method, the plate was further processed into a plate having a width of 3 cm, a depth of 4 cm, and a thickness of 3 mm and with a surface roughness (arithmetic mean roughness Ra) of about 1 m or less. Then, the molten glass adhesion evaluation test was performed by using the resulting plate as a sample 20.

Example 2

The evaluation test was performed in the same manner as Example 1 except that B (boron) with a particle size of 45 μm or less was further mixed in an amount of 0.1% m/m as a raw material of the Ni-based alloy in the preparation of a sample.

Example 3

The evaluation test was performed in the same manner as Example 2 except that the amount of B (boron) was 0.5% m/m in the preparation of a sample.

Example 4

The evaluation test was performed in the same manner as Example 2 except that the amount of B (boron) was 1.1% m/m and the amount of Si (silicon) was 2.5% mm in the preparation of a sample.

Example 5

The evaluation test was performed in the same manner as Example 1 except that the amount of Si (silicon) was 1.0% m/m in the preparation of a sample.

Example 6

The evaluation test was performed in the same manner as Example 1 except that the amount of Si (silicon) was 2.5% m/m in the preparation of a sample.

Example 7

The evaluation test was performed in the same manner as Example 4 except that Cr was not mixed as a raw material of the Ni-based alloy in the preparation of a sample.

Example 8

The evaluation test was performed in the same manner as Example 4 except that Cr was mixed in an amount of 20% m/m in the preparation of a sample.

Example 9

The evaluation test was performed in the same manner as Example 4 except that Mo was not mixed as a raw material of the Ni-based alloy in the preparation of a sample.

Example 10

The evaluation test was performed in the same manner as Example 9 except that V (vanadium) with a particle size of 150 μm or less (Kojundo Chemical Lab. Co., Ltd.) was further mixed in an amount of 0.4% m/m as a raw material of the Ni-based alloy in the preparation of a sample.

Example 11

The evaluation test was performed in the same manner as Example 1 except that WC-12% Co was not mixed as a raw material of the Ni-based alloy, but WC with a particle size of about 5 μm and Co with a particle size of about 5 μm (both available from Kojundo Chemical Lab. Co., Ltd.) were mixed at the ratios shown in Table 1 in the preparation of a sample.

Example 12

The evaluation test was performed in the same manner as Example 11 except that Co was not mixed as a raw material of the Ni-based alloy in the preparation of a sample.

Example 13

After the raw materials of the alloy were mixed at the same ratios as Example 1 and a metal plate was produced by casting, the metal plate was additionally processed into a plate having a width of 3 cm, a depth of 4 cm, and a thickness of 3 mm, and having a surface roughness (arithmetic mean roughness Ra) of about 1 μm or less. The evaluation test was performed on the resulting plate.

Example 14

The evaluation test was performed in the same manner as Example 12 except that WC fine carbide particles were not mixed, but CrC (chromium carbide) with a particle size of 45 μm or less (Kojundo Chemical Lab. Co., Ltd.) was mixed in an amount of 15.7% m/m as a raw material of the Ni-based alloy in the preparation of a sample.

Example 15

The evaluation test was performed in the same manner as Example 12 except that WC fine carbide particles were not mixed, but VC (vanadium carbide) with a particle size of 10 μm or less (Kojundo Chemical Lab. Co., Ltd.) was mixed in an amount of 15.7% m/m as a raw material of the Ni-based alloy in the preparation of a sample.

Example 16

The evaluation test was performed in the same manner as Example 12 except that WC-12% Co was not mixed, but ZrC (zirconium carbide) with a particle size of 10 μm or less (Kojundo Chemical Lab. Co., Ltd.) was mixed in an amount of 15.7% mm as a raw material of the Ni-based alloy in the preparation of a sample.

Example 17

The evaluation test was performed in the same manner as Example 12 except that WC-12% Co was not mixed, but ZrC (zirconium carbide) with a particle size of 10 μm or less (Kojundo Chemical Lab. Co., Ltd.) was mixed in an amount of 15.7% m/m as a raw material of the Ni-based alloy in the preparation of a sample.

Example 18

The evaluation test was performed in the same manner as Example 4 except that WC-12% Co was not mixed, but WC-10% Ni with a particle size of 45 μm or less (Eutectic Japan Ltd.) was mixed in an amount of 15.7% m/m as a raw material of the Ni-based alloy in the preparation of a sample.

Example 19

The evaluation test was performed in the same manner as Example 4 except that WC-12% Co was not mixed, but WC-10% Co with a particle size of 45 μm or less (Eutectic Japan Ltd.) was mixed in an amount of 15.7% mm as a raw material of the Ni-based alloy in the preparation of a sample.

Example 20

The evaluation test was performed in the same manner as Example 4 except that WC-12% Co was not mixed, but WC-20% Cr7% Ni with a particle size of 45 μm or less (Eutectic Japan Ltd.) was mixed in an amount of 15.7% m/m as a raw material of the Ni-based alloy in the preparation of a sample.

Example 21

The evaluation test was performed in the same manner as Example 1 except that WC-12% Co was not mixed, but CrC-20% Ni5% Cr with a particle size of 45 μm or less (Eutectic Japan Ltd.) was mixed in an amount of 6.7% m/m as a raw material of the Ni-based alloy in the preparation of a sample.

Example 22

The evaluation test was performed in the same manner as Example 21 except that the amount of CrC-20% Ni5% Cr was 15.7% m/m in the preparation of a sample.

Example 23

The evaluation test was performed in the same manner as Example 4 except that WC-12% Co was not mixed, but CrC-20% Ni5% Cr with a particle size of 45 μm or less was mixed in an amount of 15.7% m/m as a raw material of the Ni-based alloy in the preparation of a sample.

Example 24

The evaluation test was performed in the same manner as Example 4 except that Cr and Mo were not mixed, but Ti (titanium) with a particle size of 45 μm or less (Kojundo Chemical Lab. Co., Ltd.) was mixed in an amount of 5% m/m as a raw material of the Ni-based alloy in the preparation of a sample.

Example 25

The evaluation test was performed in the same manner as Example 4 except that Cr and Mo were not mixed, but Zr (zirconium) with a particle size of 45 μm or less (Kojundo Chemical Lab. Co., Ltd.) was mixed in an amount of 10% m/m as a raw material of the Ni-based alloy in the preparation of a sample.

Example 26

The evaluation test was performed in the same manner as Example 7 except that the amount of Mo was 5% m/m in the preparation of a sample.

Example 27

The evaluation test was performed in the same manner as Example 7 except that the amount of Mo was 10% mm in the preparation of a sample.

Example 28

The evaluation test was performed in the same manner as Example 4 except that Cr and Mo were not mixed, but Ta (tantalum) with a particle size of 45 μm or less (Kojundo Chemical Lab. Co., Ltd.) was mixed in an amount of 10% m/m as a raw material of the Ni-based alloy in the preparation of a sample.

Example 29

The evaluation test was performed in the same manner as Example 1 except that V (vanadium) was further mixed in an amount of 5% m/m as a raw material of the Ni-based alloy in the preparation of a sample.

Example 30

The evaluation test was performed in the same manner as Example 10 except that the amount of V was 5% m/m in the preparation of a sample.

Example 31

The evaluation test was performed in the same manner as Example 1 except that V and Zn were further mixed in amounts of 3% m/m and 10% m/m, respectively, as raw materials of the Ni-based alloy in the preparation of a sample.

Example 32

The evaluation test was performed in the same manner as Example 4 except that Cr and Mo were not mixed, but W (tungsten) (Kojundo Chemical Lab. Co., Ltd.) was mixed in an amount of 10% m/m as a raw material of the Ni-based alloy in the preparation of a sample.

Example 33

The evaluation test was performed in the same manner as Example 4 except that the amount of WC-12% Co was 5% mm in the preparation of a sample.

Example 34

The evaluation test was performed in the same manner as Example 4 except that the amount of WC-12% Co was 20% m/m in the preparation of a sample.

Example 35

The evaluation test was performed in the same manner as Example 1 except that P was not mixed as a raw material of the Ni-based alloy in the preparation of a sample.

Example 36

The evaluation test was performed in the same manner as Example 1 except that the amount of P was 3% m/m in the preparation of a sample.

Example 37

The evaluation test was performed in the same manner as Example 1 except that the amount of P was 5% m/m in the preparation of a sample.

Example 38

The evaluation test was performed in the same manner as Example 4 except that Sb (antimony) with a particle size of 150 μm or less (Kojundo Chemical Lab. Co., Ltd.) was further mixed in an amount of 10% m/m as a raw material of the Ni-based alloy in the preparation of a sample.

Example 39

The evaluation test was performed in the same manner as Example 4 except that P was not mixed, but Bi (bismuth) with a particle size of 150 μm or less (Kojundo Chemical Lab. Co., Ltd.) was further mixed in an amount of 5% m/m as a raw material of the Ni-based alloy in the preparation of a sample.

Example 40

The evaluation test was performed in the same manner as Example 4 except that cerium oxide was further mixed in an amount of 10% m/m as a raw material of the Ni-based alloy in the preparation of a sample.

Example 41

The evaluation test was performed in the same manner as Example 4 except that Y (yttrium) with a particle size of 150 μm or less (Kojundo Chemical Lab. Co., Ltd.) was further mixed in an amount of 1.11% m/m as a raw material of the Ni-based alloy in the preparation of a sample.

Example 42

The evaluation test was performed in the same manner as Example 4 except that Y (yttrium) was further mixed in an amount of 10% m/m as a raw material of the Ni-based alloy in the preparation of a sample.

Example 43

The evaluation test was performed in the same manner as Example 4 except that Mn (manganese) with an average particle size of 50 μm or less (Kojundo Chemical Lab. Co., Ltd.) was further mixed in an amount of 5% m/m as a raw material of the Ni-based alloy in the preparation of a sample.

Example 44

The evaluation test was performed in the same manner as Example 4 except that Re (rhenium) with a particle size of 45 μm or less (Kojundo Chemical Lab. Co., Ltd.) was further mixed in an amount of 10% m/m as a raw material of the Ni-based alloy in the preparation of a sample.

Example 45

The evaluation test was performed in the same manner as Example 1 except that raw materials of Ni-based allow comprised of Si, $Ni_2P$, Cr, the balance Ni, Mo, and Fe (iron) powder (all available from Kojundo Chemical Lab. Co., Ltd.), as well as WC-12% Co with a particle size of 15-45 μm (Eutectic Japan Ltd.) as hard particles, were mixed at the ratios shown in Table 11, to thereby produce the alloy.

Example 46

The evaluation test was performed in the same manner as Example 4 except that Cu (copper) with an average particle size of 50 μm or less (Kojundo Chemical Lab. Co., Ltd.) was further mixed in an amount of 5% m/m as a raw material of the Ni-based alloy in the preparation of a sample.

Example 47

The evaluation test was performed in the same manner as Example 4 except that Ag (silver) with an average particle size of 50 μm or less (Kojundo Chemical Lab. Co., Ltd.) was further mixed in an amount of 1.34% m/m as a raw material of the Ni-based alloy in the preparation of a sample.

Example 48

A metal powder as a raw material of the alloy was prepared by using a gas atomization method such that the resulting metal powder had a composition and a particle size (median diameter) shown in Table 16, where the composition was analyzed by ICP emission spectroscopy and the particle sizes were measured by laser diffraction spectrometry. After the metal powder was mixed with WC-12% Co, the mixed powder was thermal-sprayed on the surface of a gray cast iron plate by using a high-speed frame thermal spraying method (HVOF (High Velocity Oxygen Fuel) method), to form a nickel-based alloy film having a thickness of about 0.8 mm, which was used as a test piece. Table 14 shows the composition of the thermal-sprayed coating measured with a fluorescent X-ray analyzer. The test piece was additionally processed into a plate having a width of 3 cm, a depth of 4 cm, and a thickness of 3 mm, and having a surface roughness (arithmetic mean roughness Ra) of about 1 μm or less. The resulting plate was used as Example 48, and the molten glass adhesion evaluation test was performed on the alloy film of the plate as a sample surface.

TABLE 16

Powder for thermal spraying used in Example 48

| | | | composition (% m/m) | | | | |
|---|---|---|---|---|---|---|---|
| Si | P | Cr | Ni (balance) | Mo | impurities | median diameter | production method |
| 5.7 | 1.9 | 5.3 | 84.56 | 2.4 | 0.142 | 30.8 μm | gas atomization |

Comparative Example 1

The evaluation test was performed in the same manner as Example 2 except that B was mixed in an amount of 5.0% m/m in the preparation of a sample.

Comparative Example 2

The evaluation test was performed in the same manner as Comparative Example 1 except that Si was not mixed as a raw material of the Ni-based alloy in the preparation of a sample.

Comparative Example 3

The evaluation test was performed in the same manner as Comparative Example 2 except that B and P were not mixed as raw materials of the Ni-based alloy in the preparation of a sample.

Comparative Example 4

The evaluation test was performed in the same manner as Comparative Example 2 except that P was not mixed as a raw material of the Ni-based alloy in the preparation of a sample.

Comparative Example 5

The evaluation test was performed in the same manner as Comparative Example 2 except that P was mixed in an amount of 3% m/m in the preparation of a sample.

(Effects of B and Si)

Figure 5:
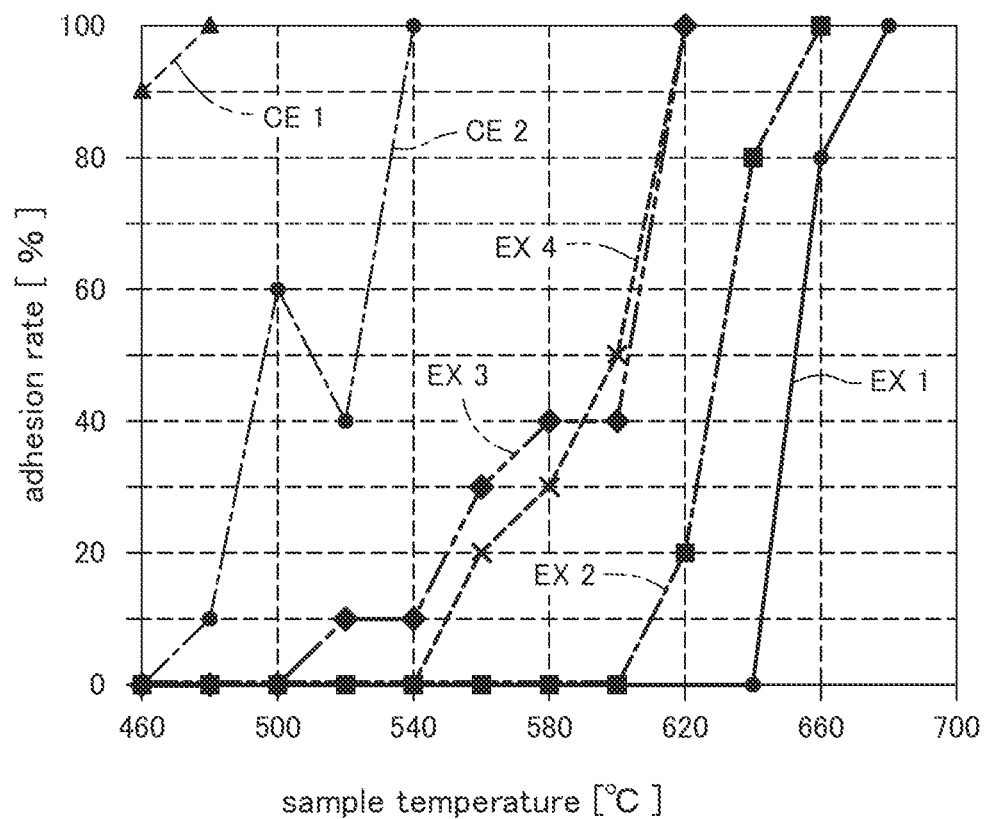
FIG. 5 is a graph showing the adhesion rate of a molten glass gob with respect to the sample surface temperature for each of Examples 1 to 4 and Comparative Examples 1 and 2.
Figure 6:
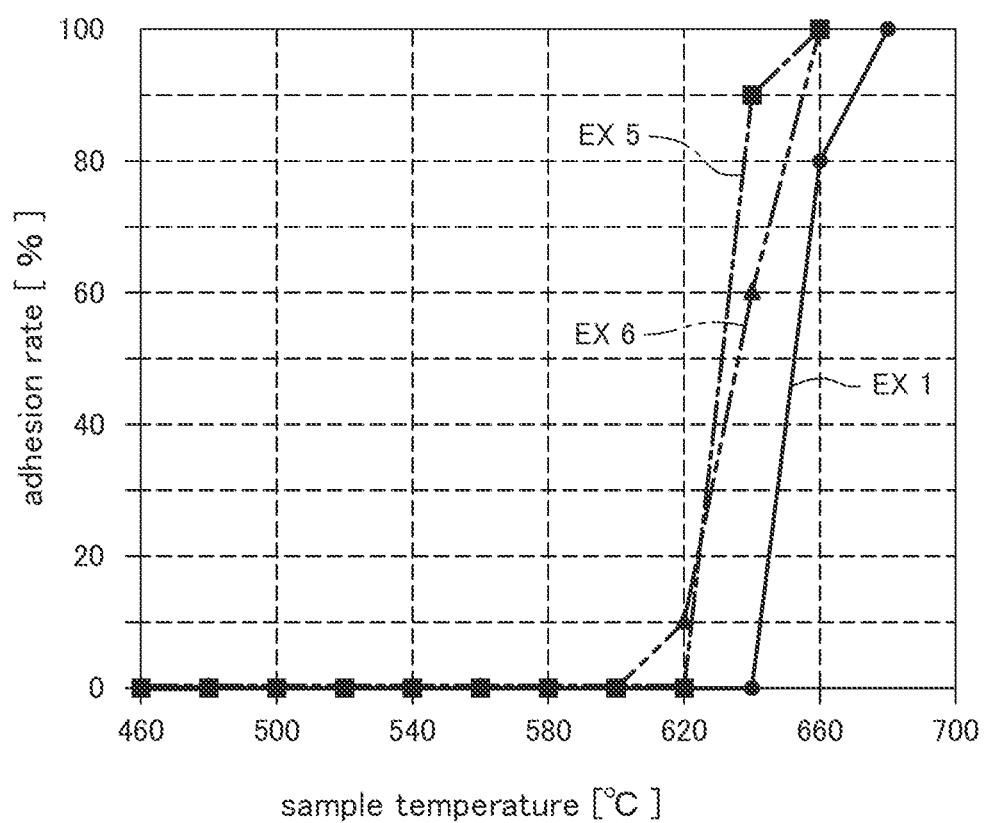
FIG. 6 is a graph showing the adhesion rate of a molten glass gob with respect to the sample surface temperature for each of Examples 1, 5 and 6.

FIG. 5 shows the adhesion test results of the molten glass gobs of Examples 1 to 4 and Comparative Examples 1 and 2. The test results show that, at each sample surface temperature, the lower the adhesion rate is, the greater the slipperiness of a molten glass gob. Criteria for the evaluation are that, at each of the sample surface temperatures 480° C., 500° C., and 520° C., when the adhesion rate was less than 10%, the slipperiness met the acceptance criteria and indicated as "✓" (check mark), and when the adhesion rate was 10% or more, the slipperiness did not meet the criteria and indicated as "x" (cross mark). As can be seen from FIG. 5, the adhesive rate decreases with a decreasing amount of B (boron). Example 4, in which the amount of B is 1.1% m/m, met the criteria whereas Comparative Examples 1 and 2, in which the amount of B is 5.0% m/m did not meet the criteria. Thus, the threshold amount value of B which met the criteria was in the range of more than 1.1% and less than 5.0% m/m. In other words, the smaller the amount of B is in the Ni-based self-fluxing alloy, the better. For example, the amount of B is preferably in the range of from 0% to less than 1.0% m/m. Accordingly, reduction of the amount of B in the Ni-based self-fluxing alloy improves the slipperiness of the alloy against a glass gob. FIG. 6 shows the adhesion test results of the molten glass gobs of Examples 1 to 4 and Comparative Examples 1, 5 and 6, in which no boron was included in the Ni-based self-fluxing alloy. Similarly to FIG. 5, the test results in FIG. 6 show that, when the amount of Si is in the range of from 0% to 1.0% m/m, the Ni-based self-fluxing alloy exhibited good slipperiness against a glass gob.

Figure 23:
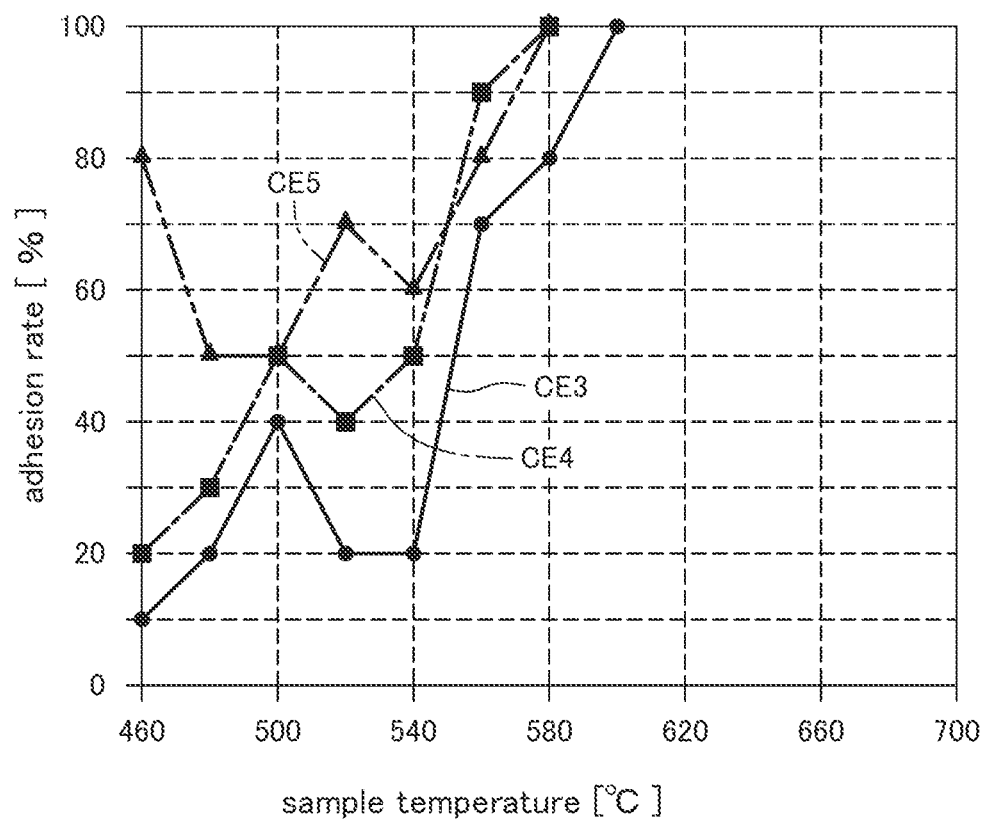
FIG. 23 is a graph showing the adhesion rate of a molten glass gob with respect to the sample surface temperature for each of Comparative Examples 3 to 5.

FIG. 23 shows the adhesion test results of the molten glass gobs of Comparative Examples 3 to 5, in which Si was not mixed in the Ni-based self-fluxing alloy. FIGS. 1 and 23 show that, when Si was not mixed, the alloy against exhibited poor slipperiness against a molten glass gob, regardless of the amounts of B and P.

The Ni-based self-fluxing alloy according to the above-described embodiment can achieve an improved slipperiness against a molten glass gob. Furthermore, at least one of the flux components, B and Si, contained in the alloy enables the alloy to be subjected to a fusing treatment.

(Effects of Cr)

Figure 7:
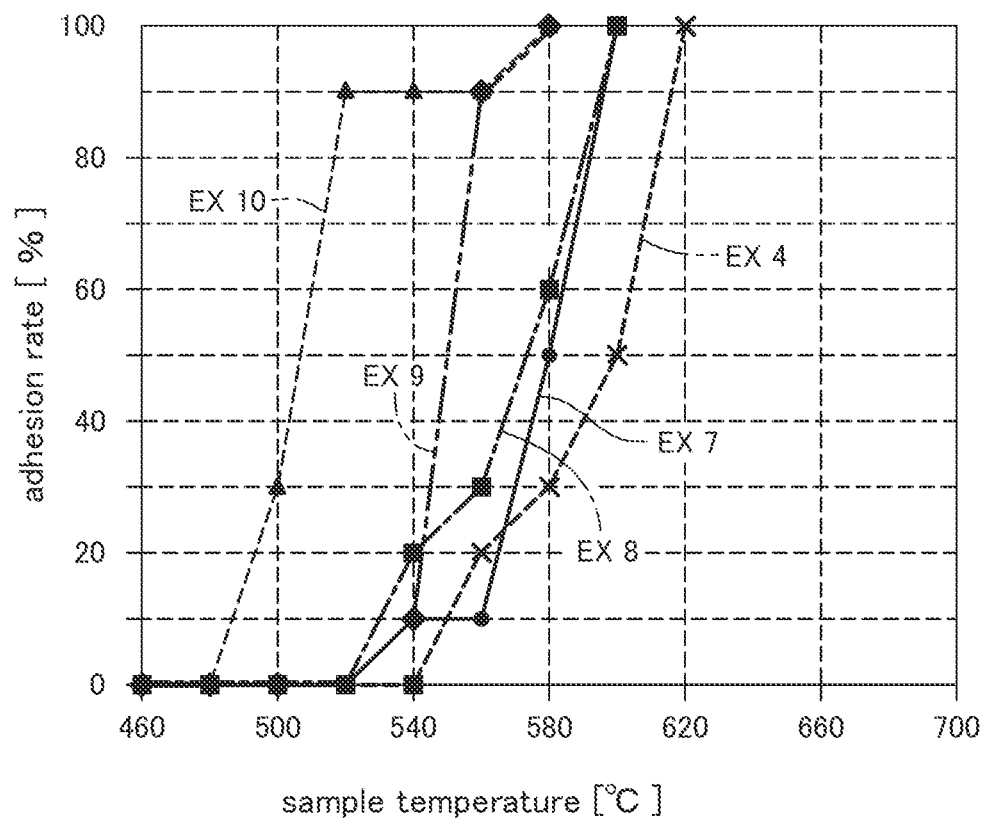
FIG. 7 is a graph showing the adhesion rate of a molten glass gob with respect to the sample surface temperature for each of Examples 4 and 7 to 10.

FIG. 7 shows the adhesion test results of the molten glass gobs of Examples 4 and 7 to 10. FIG. 7 shows that the adhesive rate decreases with an increasing amount of Cr (chromium), but Example 7, in which Cr was not mixed in the Ni-based self-fluxing alloy, still met the acceptance criteria.

(Effects of Carbides)

Figure 10:
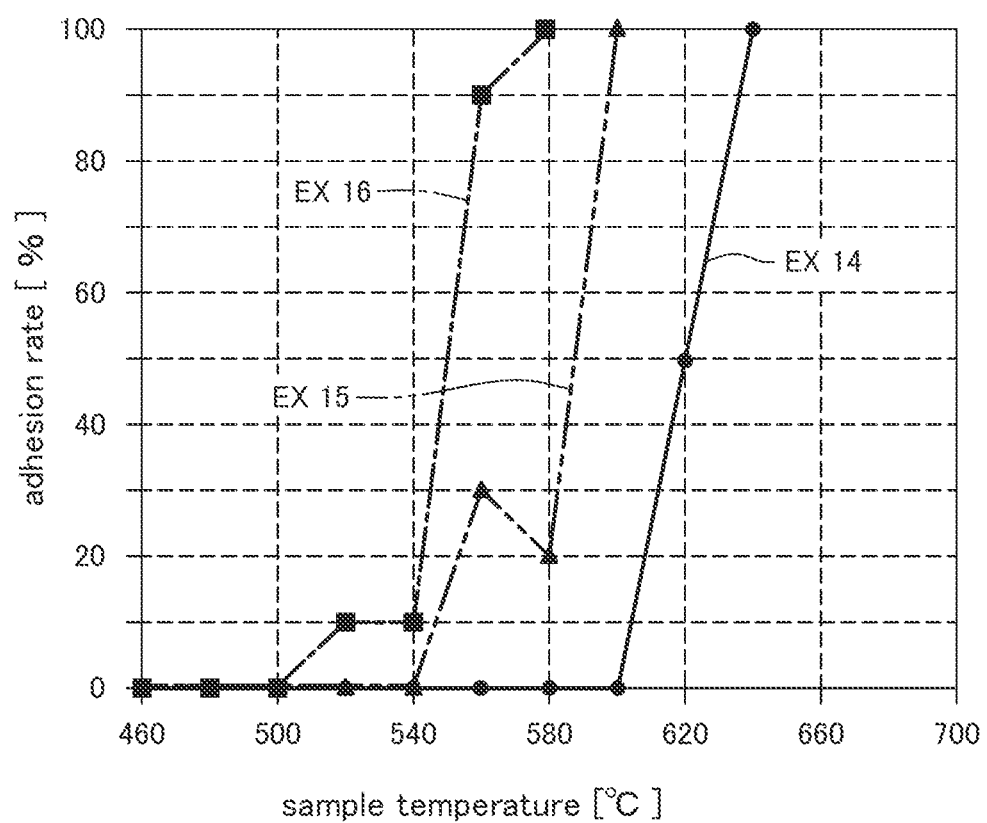
FIG. 10 is a graph showing the adhesion rate of a molten glass gob with respect to the sample surface temperature for each of Examples 14 to 16.
Figure 11:
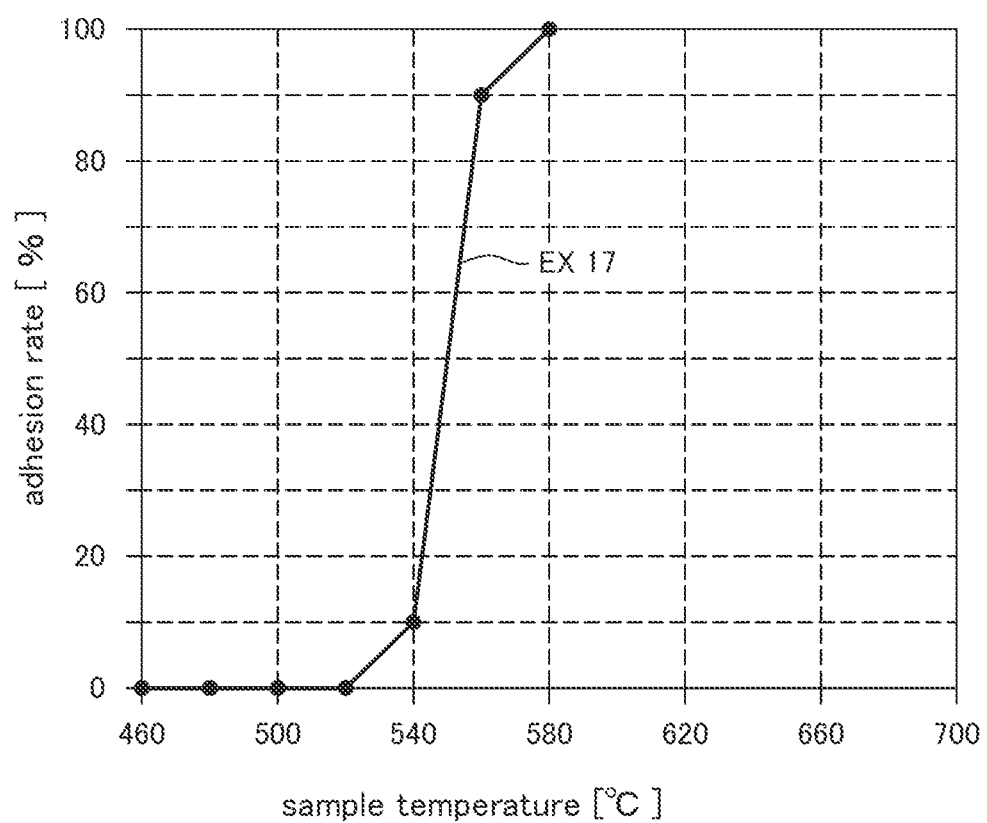
FIG. 11 is a graph showing the adhesion rate of a molten glass gob with respect to the sample surface temperature for Example 17.

FIG. 10 shows the adhesion test results of the molten glass gobs of Examples 14 to 16. FIG. 10 shows that the Ni-based self-fluxing alloy containing, as hard particles, carbides of any one of the Group 4, 5 and 6 elements, met the acceptable criteria in most cases. FIG. 11 shows the adhesion test results of the molten glass gob of Example 17. FIG. 11 shows that the Ni-based self-fluxing alloy containing silicon carbide as hard particle met the acceptable criteria.

(Effects of Cermets)

Figure 12:
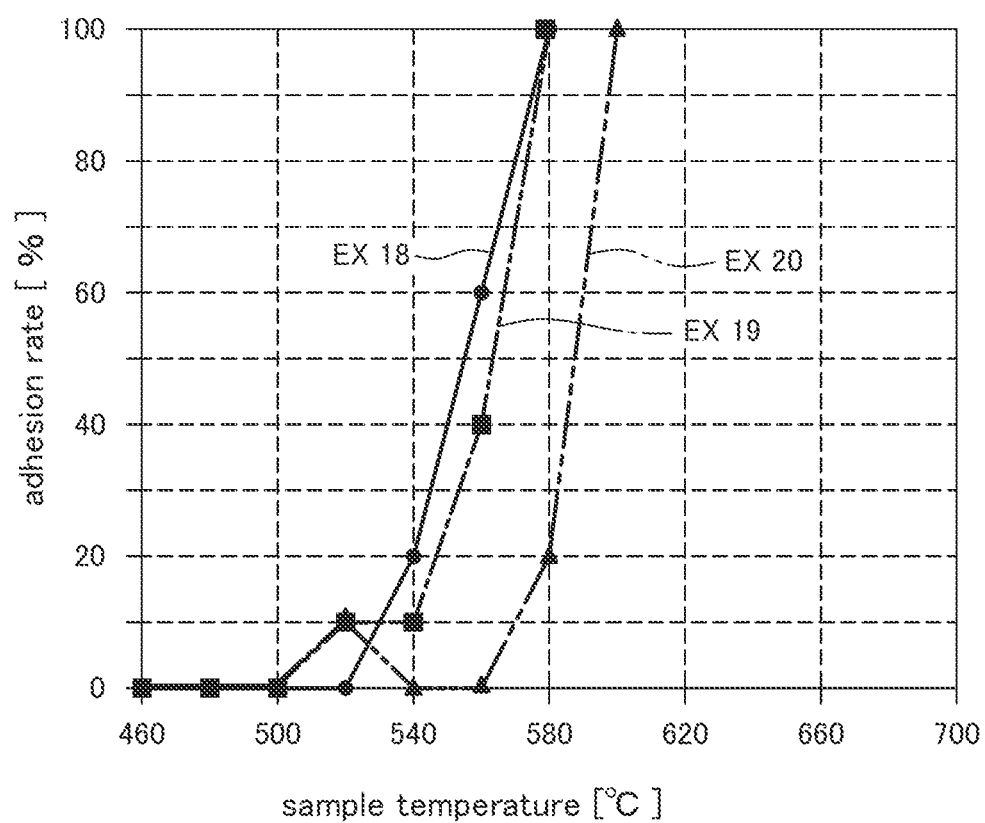
FIG. 12 is a graph showing the adhesion rate of a molten glass gob with respect to the sample surface temperature for each of Examples 18 to 20.
Figure 13:
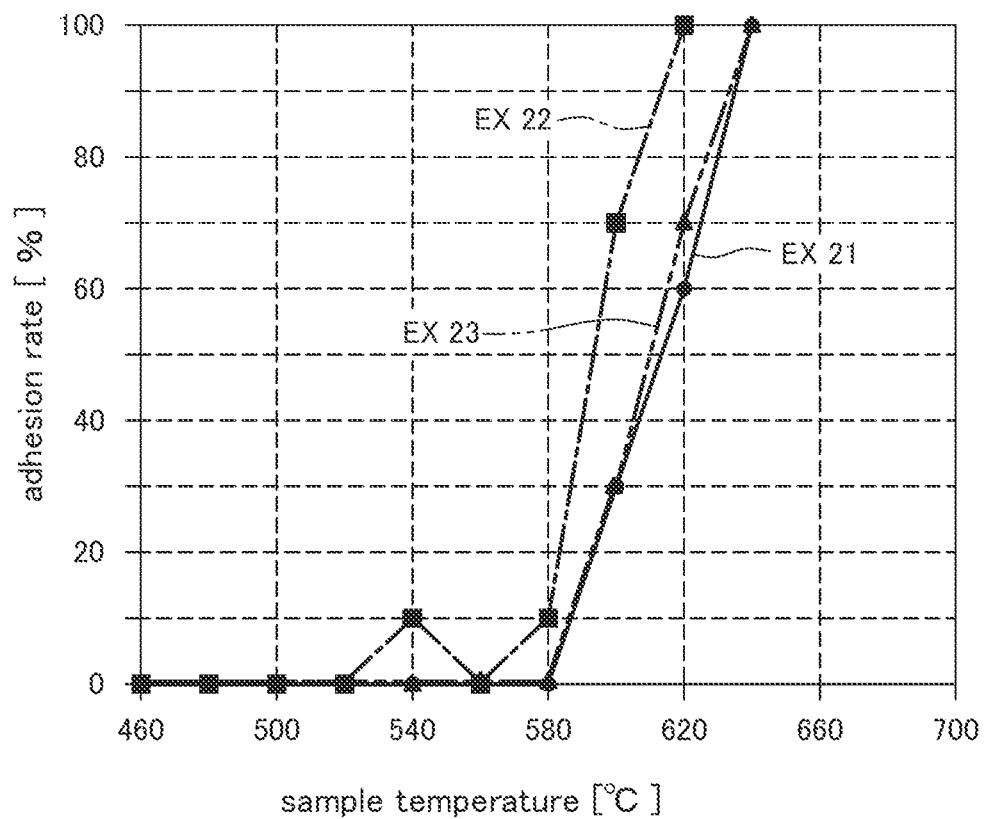
FIG. 13 is a graph showing the adhesion rate of a molten glass gob with respect to the sample surface temperature for each of Examples 21 to 23.

FIG. 12 shows the adhesion test results of the molten glass gobs of Examples 18 to 20. FIG. 12 shows that the Ni-based self-fluxing alloy containing a WC cermet which is not WC-12% Co cermet met the acceptable criteria. FIG. 13 shows the adhesion test results of the molten glass gobs of Examples 21 to 23. FIG. 13 shows that the Ni-based self-fluxing alloy containing, as hard particles, CrC cermet met the acceptable criteria.

(Effects of Group 4, 5 and 6 Elements)

Figure 14:
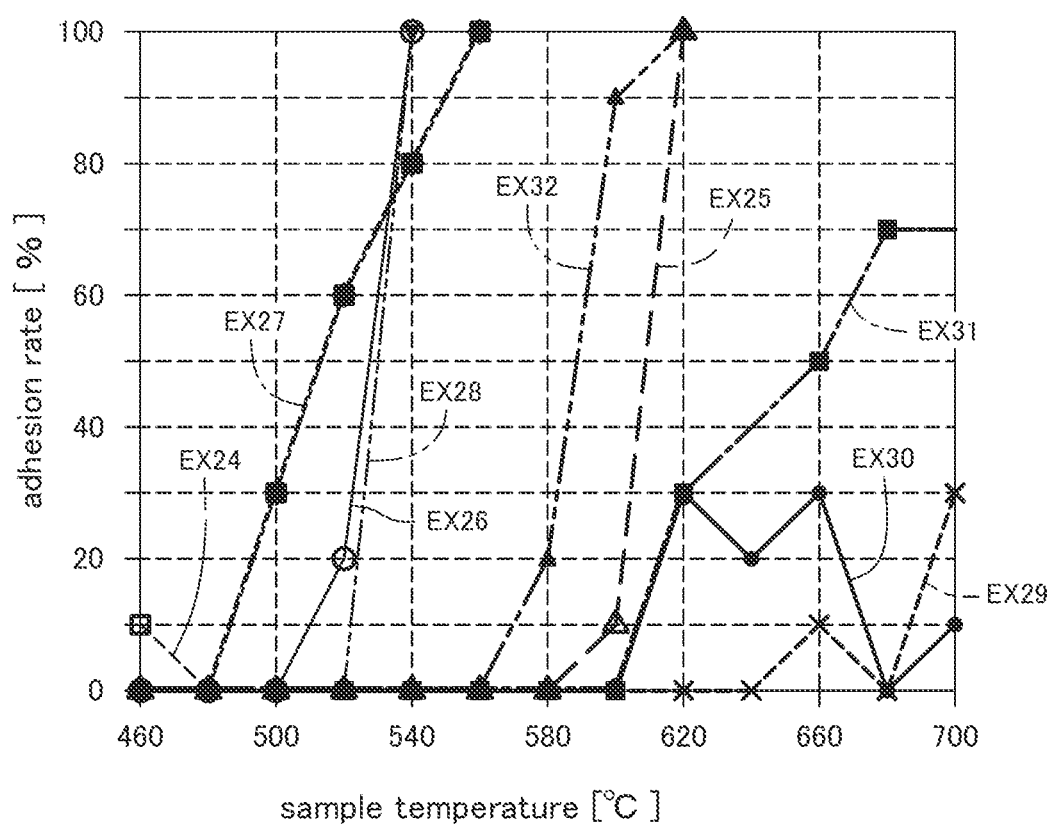
FIG. 14 is a graph showing the adhesion rate of a molten glass gob with respect to the sample surface temperature for each of Examples 24 to 32.

FIG. 14 shows the adhesion test results of the molten glass gobs of Examples 24 to 32. FIG. 14 shows that the Ni-based self-fluxing alloy containing a component selected from Group 4, 5 and 6 elements met the acceptable criteria in many cases.

(Effects of Hard Particles)

Figure 15:
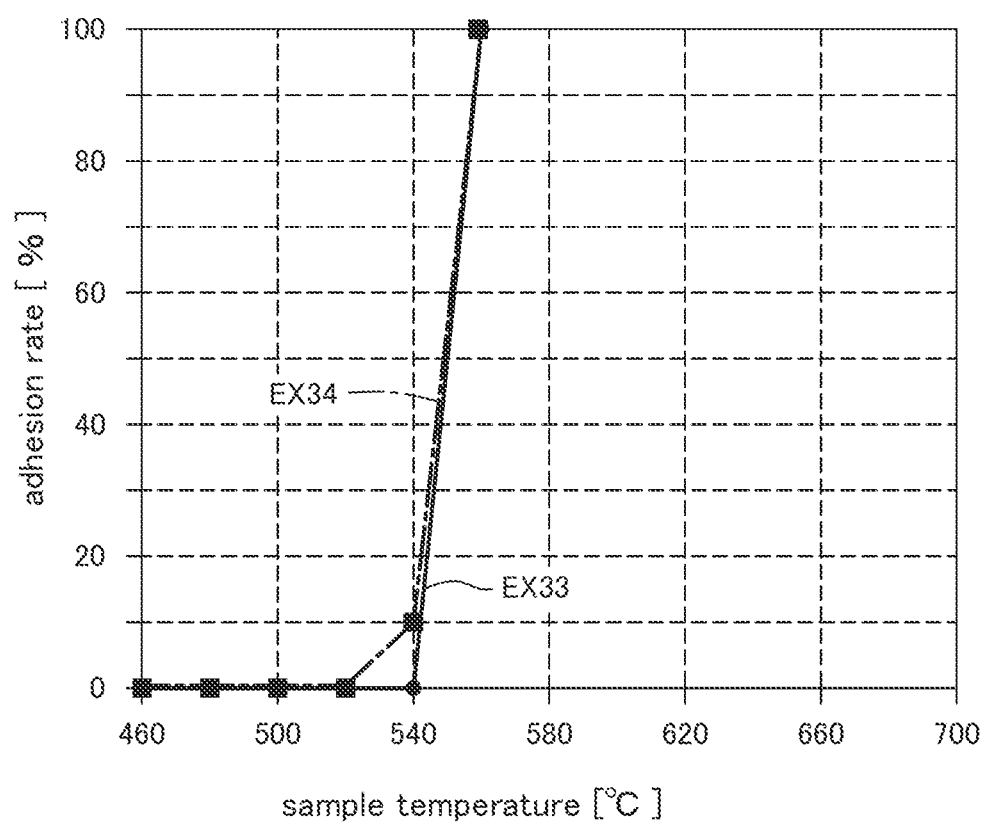
FIG. 15 is a graph showing the adhesion rate of a molten glass gob with respect to the sample surface temperature for each of Examples 33 and 34.

FIG. 15 shows the adhesion test results of the molten glass gobs of Examples 33 and 34. FIG. 15 shows that the Ni-based self-fluxing alloy containing WC-12% Co in a wide range of amounts met the acceptable criteria.

(Effects of Group 15 Elements)

Figure 16:
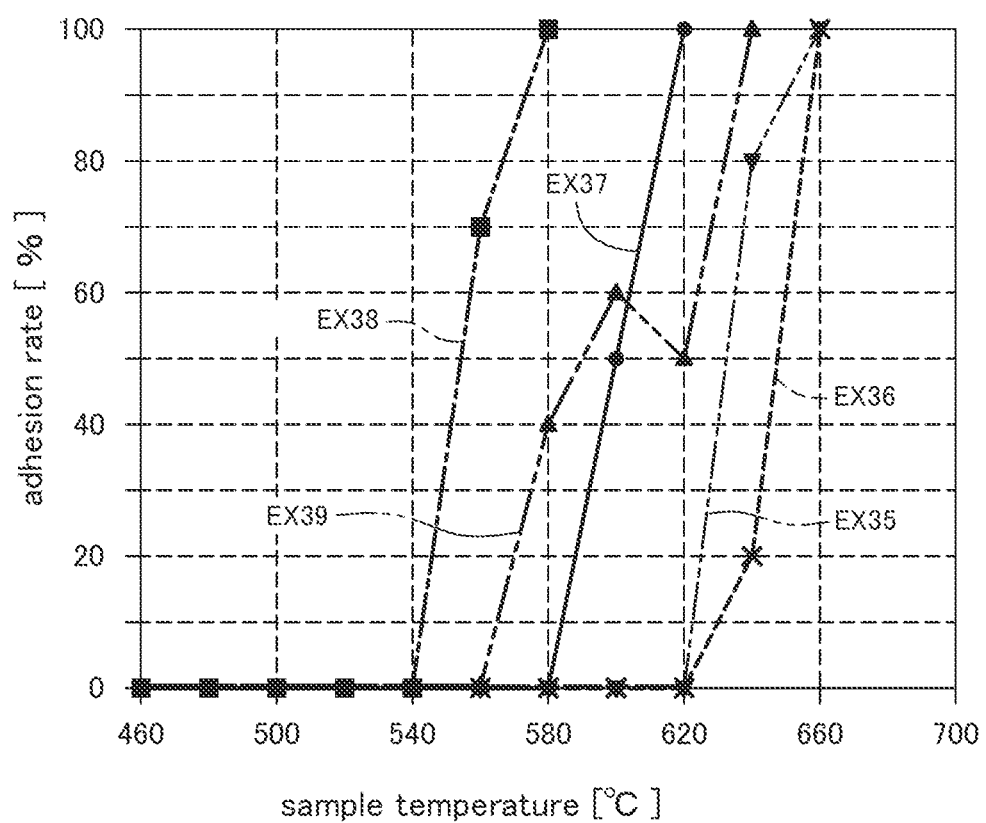
FIG. 16 is a graph showing the adhesion rate of a molten glass gob with respect to the sample surface temperature for each of Examples 35 to 39.

FIG. 16 shows the adhesion test results of the molten glass gobs of Examples 35 to 39. The test results of Examples 35 to 37 show that the Ni-based self-fluxing alloy containing P met the acceptable criteria, regardless of the amount of P, a Group 15 element. The test results of Example 38 show that the Ni-based self-fluxing alloy containing two or more Group 15 elements met the acceptable criteria. The test results of Example 39 show that the Ni-based self-fluxing alloy containing a Group 15 element other than P met the acceptable criteria.

(Effects of the Type of Hard Particles)

Figure 17:
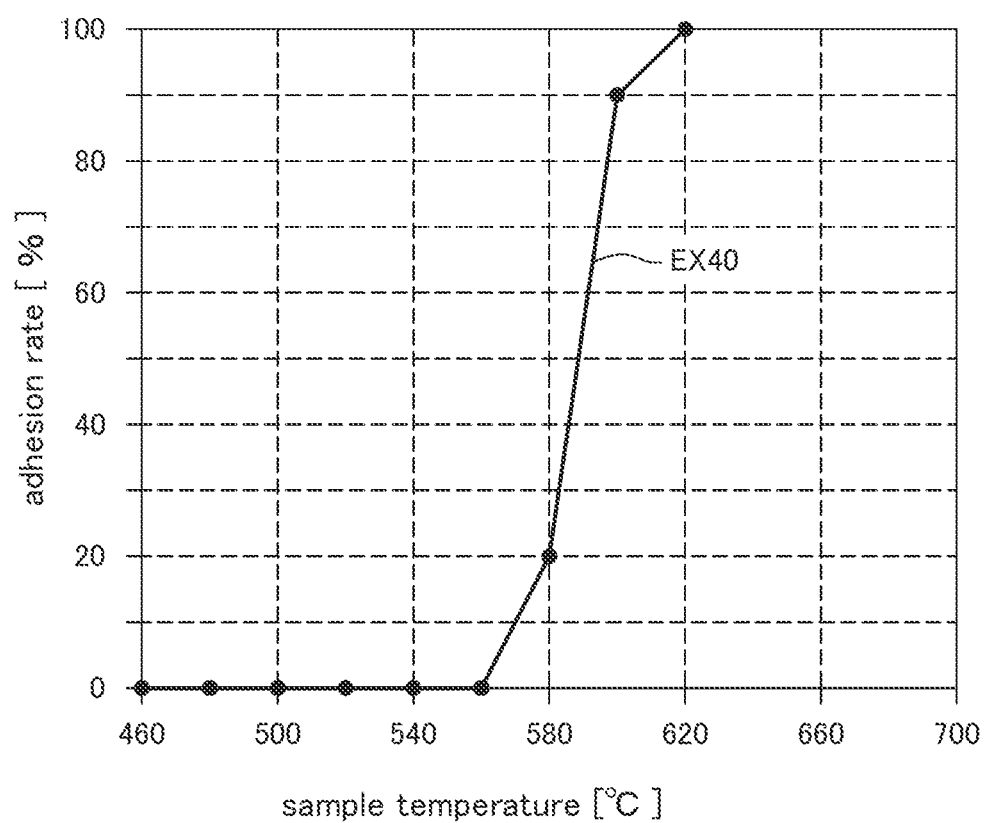
FIG. 17 is a graph showing the adhesion rate of a molten glass gob with respect to the sample surface temperature for Example 40.

FIG. 17 shows the adhesion test results of the molten glass gobs of Example 40. FIG. 17 shows that the Ni-based self-fluxing alloy containing hard particles which is not a metal carbide, met the acceptable criteria.

(Effects of Group 3 Elements)

Figure 18:
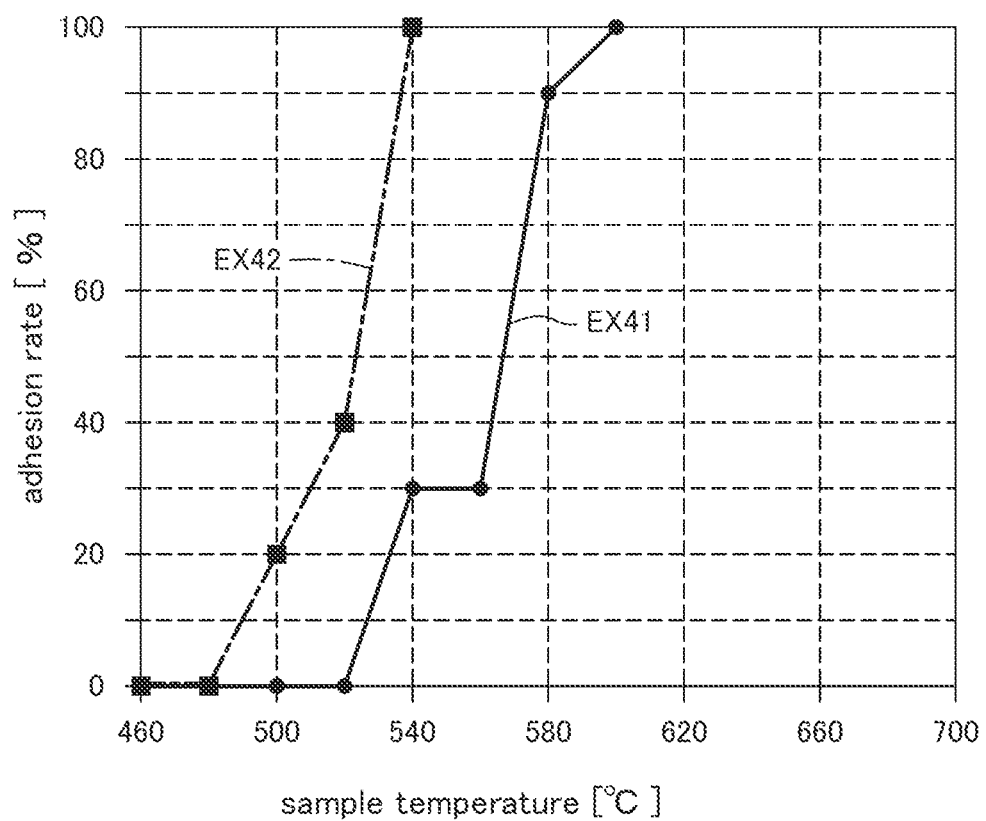
FIG. 18 is a graph showing the adhesion rate of a molten glass gob with respect to the sample surface temperature for each of Examples 41 and 42.

FIG. 18 shows the adhesion test results of the molten glass gobs of Examples 41 and 42. FIG. 18 shows that the Ni-based self-fluxing alloy containing a Group 3 element met the acceptable criteria.

(Effects of Group 7 Elements)

Figure 19:
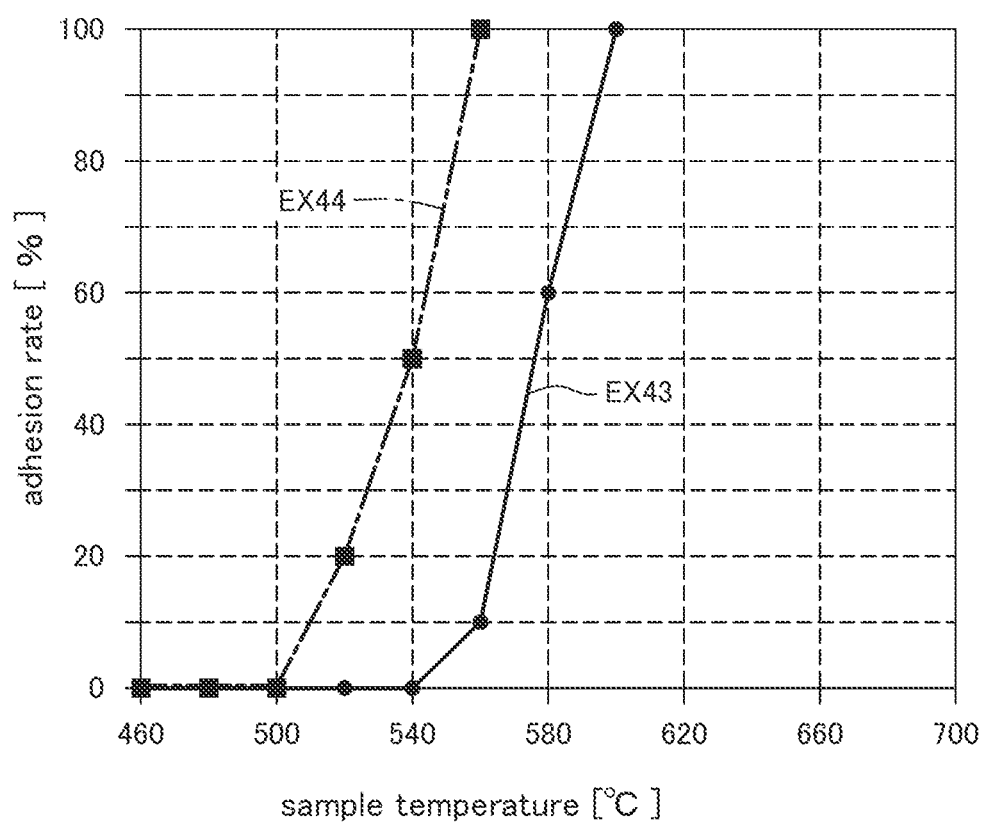
FIG. 19 is a graph showing the adhesion rate of a molten glass gob with respect to the sample surface temperature for each of Examples 43 and 44.

FIG. 19 shows the adhesion test results of the molten glass gobs of Examples 43 and 44. FIG. 19 shows that the Ni-based self-fluxing alloy containing a Group 7 element met the acceptable criteria.

(Effects of Group 8 Elements)

Figure 20:
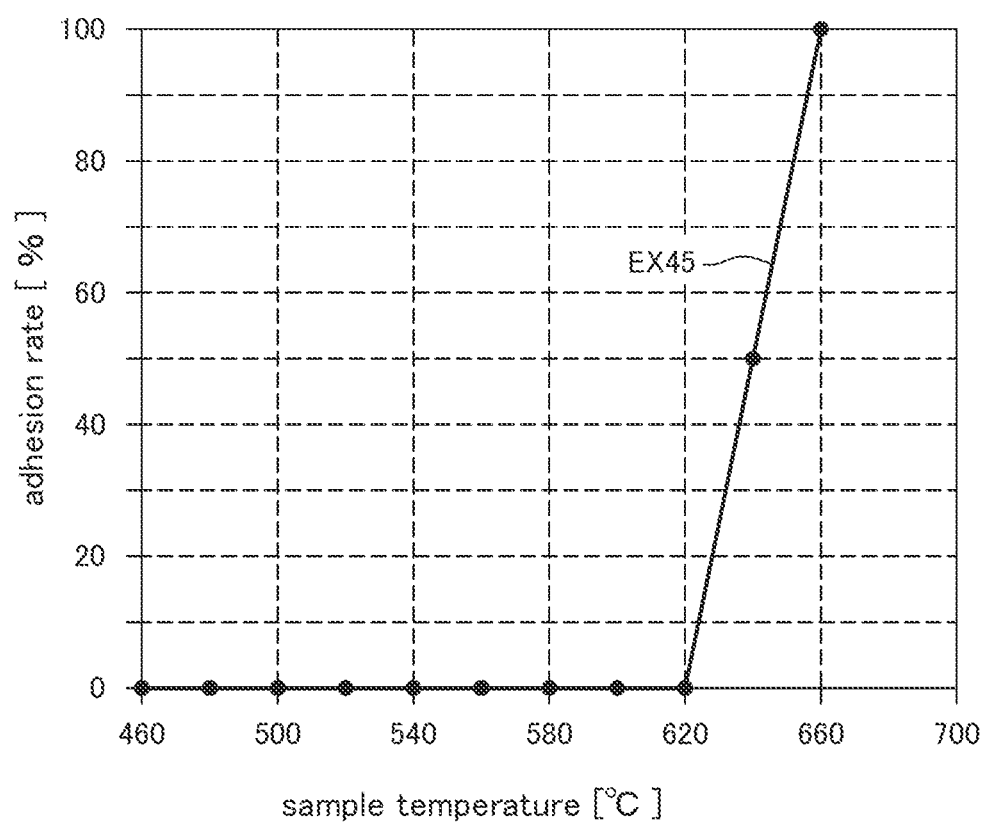
FIG. 20 is a graph showing the adhesion rate of a molten glass gob with respect to the sample surface temperature for Example 45.

FIG. 20 shows the adhesion test results of the molten glass gobs of Example 45. FIG. 20 shows that the Ni-based self-fluxing alloy containing a Group 8 element met the acceptable criteria.

(Effects of Group 11 Elements)

Figure 21:
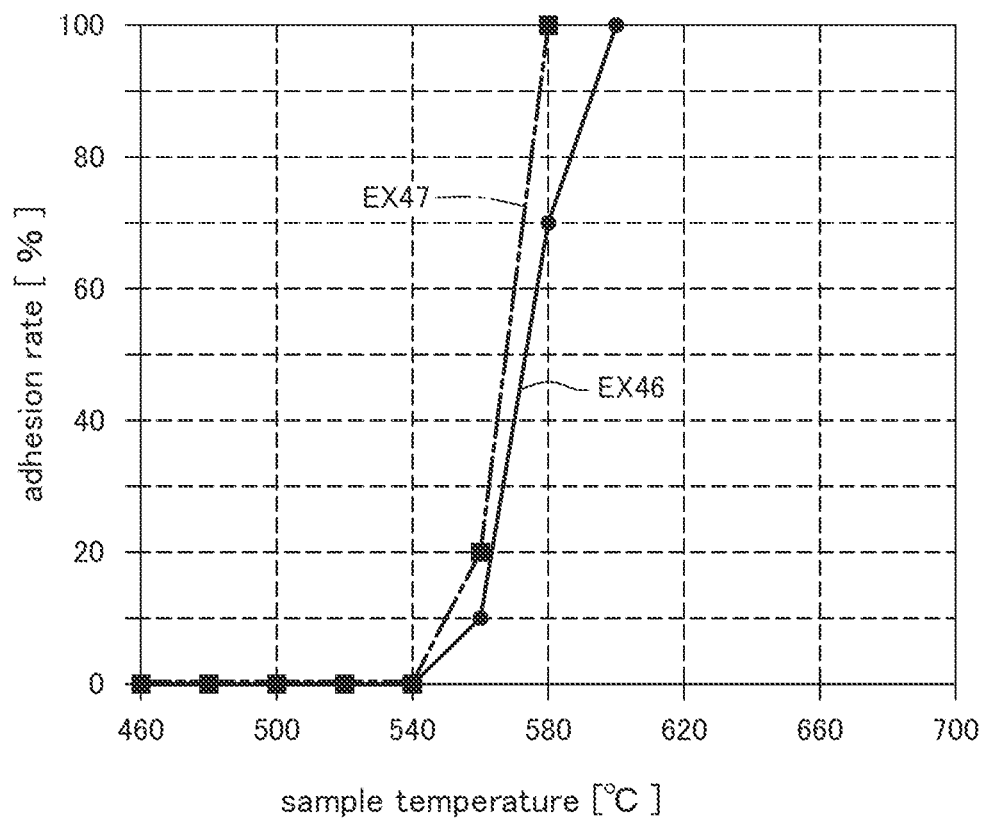
FIG. 21 is a graph showing the adhesion rate of a molten glass gob with respect to the sample surface temperature for each of Examples 46 and 47.

FIG. 21 shows the adhesion test results of the molten glass gobs of Examples 46 and 47. FIG. 21 shows that the Ni-based self-fluxing alloy containing a Group 11 element met the acceptable criteria.

(Effects of Dispersion State of Hard Particles)

Figure 8:
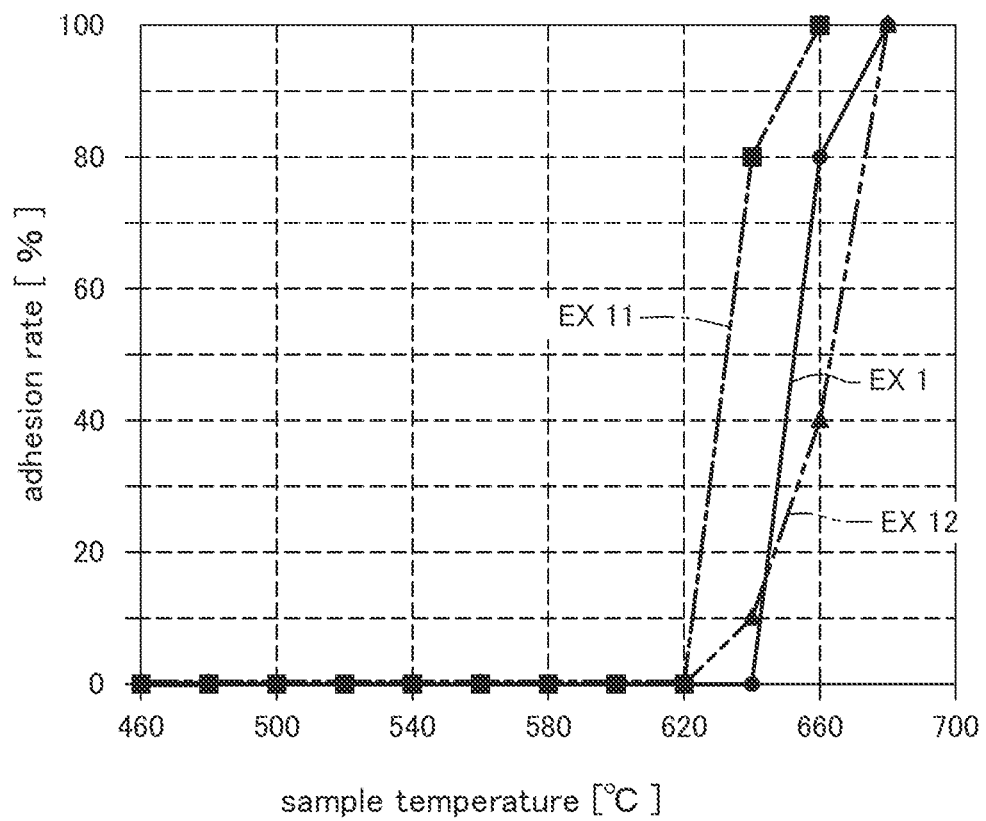
FIG. 8 is a graph showing the adhesion rate of a molten glass gob with respect to the sample surface temperature for each of Examples 1, 11 and 12.

FIG. 8 shows the adhesion test results of the molten glass gobs of Examples 1, 11 and 12. FIG. 8 shows that whether cermet particles or fine carbide particles were used to achieve dispersion state of hard particles did not affect the slipperiness characteristic of the Ni-based self-fluxing alloy.

(Effects of the Sample Preparation Method)

Figure 9:
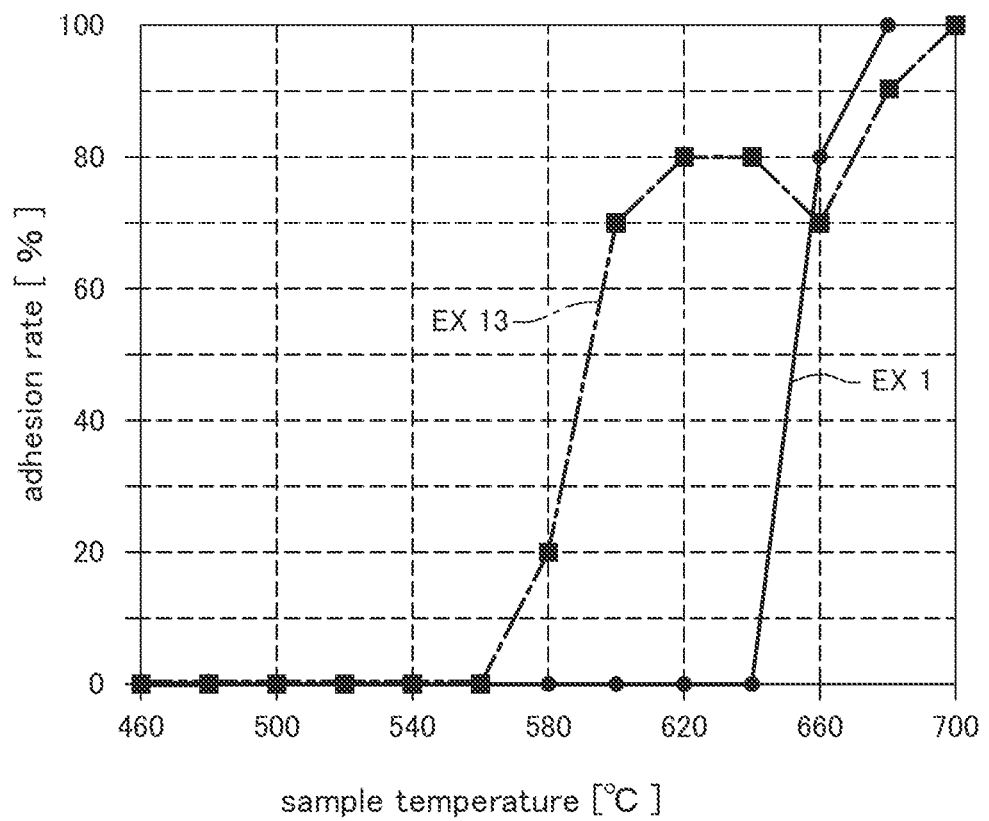
FIG. 9 is a graph showing the adhesion rate of a molten glass gob with respect to the sample surface temperature for each of Examples 1 and 13.

FIG. 9 shows the adhesion test results of the molten glass gobs of Examples 1 and 13. FIG. 9 shows that whether the alloy was made by directly from raw material powders or by completely dissolving metal materials and then solidifying the materials, did not affect the slipperiness characteristic of the Ni-based self-fluxing alloy. Therefore, for example, a powder of the alloy to be thermal-sprayed may be produced by using various commonly known methods such as molten-spraying (atomizing), melting and crushing, sintering and crushing, granulating, granulating and sintering, coating, and blending.

Figure 22:
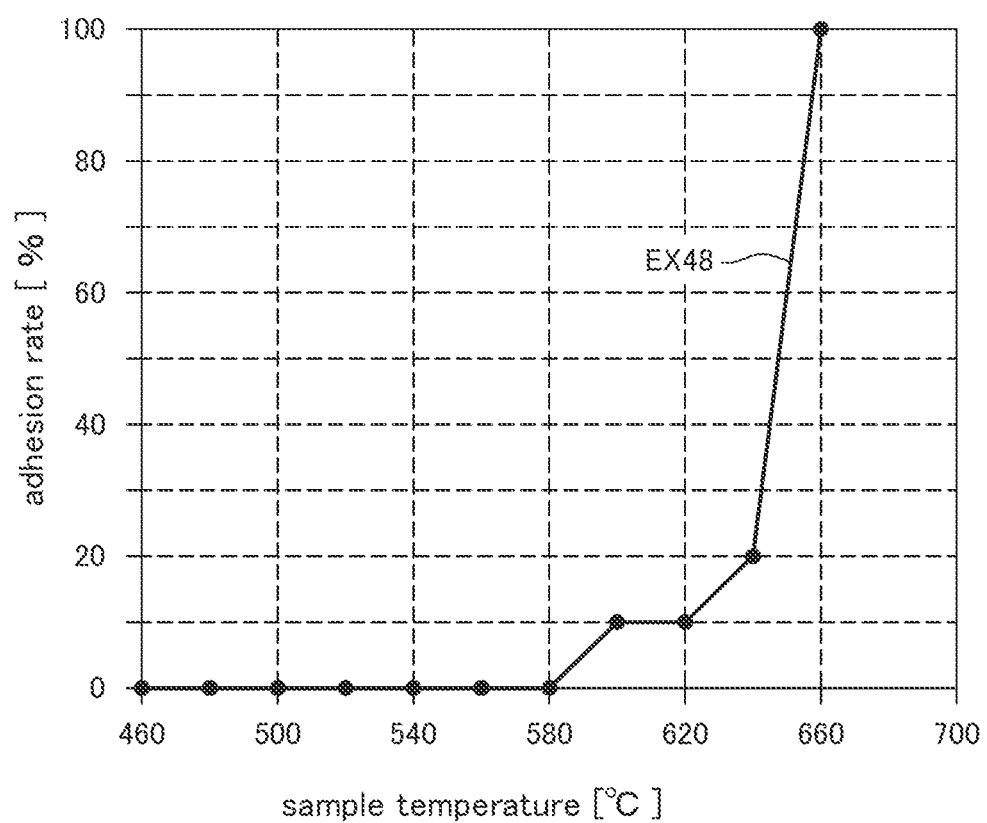
FIG. 22 is a graph showing the adhesion rate of a molten glass gob with respect to the sample surface temperature for Example 48.

FIG. 22 shows the adhesion test results of the molten glass gobs of Example 48. FIG. 22 shows that whether the Ni-based self-fluxing alloy is prepared by not using a base material or by forming the alloy into a film on a surface of a base material, did not affect the slipperiness characteristic of the Ni-based self-fluxing alloy. Therefore, when being prepared in the form of a film, the alloy may be prepared by using various commonly known methods such as thermal spraying, plating, cladding, laminate molding and welding.

The Ni-based self-fluxing alloy of the present invention has characteristics such that, when the Ni-based self-fluxing alloy is formed into a plate, heated to 480° C. and placed to be inclined at 70 degrees with respect to the horizontal, and 0.3 g of molten glass heated to 1,000° C. is dropped onto the heated plate of the Ni-based self-fluxing alloy, the molten glass slides down without adhering to the plate of the Ni-based self-fluxing alloy. Due to the characteristics of the alloy, the alloy used in a glass molding process can exhibit low friction against a molten glass gob and excellent moldability.

The present invention has been described in terms of a specific embodiment, but is not limited by such an embodiment, and can be modified in various ways without departing from the scope of the present invention.

INDUSTRIAL APPLICABILITY

A nickel-based self-fluxing alloy of the present invention can be used in glass manufacturing members, examples of which include metal parts such as a mold, a plunger, and a roller, and transporting members such as a shooter for transporting a molten glass gob in a glass bottle molding process.

GLOSSARY 14 metal material
15 metal oxide film
16 molten glass gob
20 sample
21 molten glass adhesion testing device
22 glass rod
23 glass rod holder
24 glass rod heating device
26 sample holder
27 sample heating device
28 burner support frame
29 burner
30 heaters
31 thermocouple
32 temperature controller
42 mold
43 molten glass tank
44 molten glass transporting member

The invention claimed is:

1. A nickel-based self-fluxing alloy used in a glass manufacturing member for transporting or molding glass with a viscosity of log $\eta$=3 to 14.6, the nickel-based self-fluxing alloy comprising:
   boron (B) in an amount of ranging from 0 percent to 1.5 percent by mass;
   hard particles;
   silicon (Si); and
   at least one element selected from Group 15 elements.

2. The nickel-based self-fluxing alloy according to claim 1, wherein the nickel-based self-fluxing alloy comprises boron (B) in an amount of ranging from 0 percent to less than 1.0 percent by mass.

3. The nickel-based self-fluxing alloy according to claim 1, wherein the nickel-based self-fluxing alloy comprises boron (B) in an amount of ranging from more than 0 percent to less than 1.0 percent by mass.

4. The nickel-based self-fluxing alloy according to claim 1, wherein the at least one element selected from Group 15 elements comprises phosphorus (P).

5. The nickel-based self-fluxing alloy according to claim 1, wherein the at least one element selected from Group 15 elements is contained in the nickel-based self-fluxing alloy in an amount of ranging from 0 percent to 15 percent by mass.

6. The nickel-based self-fluxing alloy according to claim 1, wherein the hard particles contain at least one of a carbide, a nitride, an oxide and a cermet.

7. The nickel-based self-fluxing alloy according to claim 6, wherein the carbide comprises a carbide of any one of the Group 4, 5 and 6 elements.

8. The nickel-based self-fluxing alloy according to claim 6, wherein the carbide is silicon carbide.

9. The nickel-based self-fluxing alloy according to claim 6, wherein the cermet comprises a carbide of any one of the Group 4, 5 and 6 elements.

10. The nickel-based self-fluxing alloy according to claim 6, wherein the oxide comprises at least one selected from lanthanide metal oxides.

11. The nickel-based self-fluxing alloy according to claim 10, wherein the at least one selected from lanthanide metal oxides is a cerium oxide.

12. The nickel-based self-fluxing alloy according to claim 1, wherein the nickel-based self-fluxing alloy comprises at least one metal selected from Group 4, 5 and 6 elements in an amount of ranging from 0 percent to 30 percent by mass.

13. The nickel-based self-fluxing alloy according to claim 12, wherein the at least one metal selected from Group 4, 5 and 6 elements comprises chromium (Cr).

14. The nickel-based self-fluxing alloy according to claim 12, wherein the nickel-based self-fluxing alloy comprises:
   silicon (Si) in an amount of ranging from 1 percent to 7.5 percent by mass;
   the hard particles in an amount of 5 percent to 50 percent by mass; and
   chromium (Cr) in an amount of ranging from 2.5 percent to 30 percent by mass.

15. The nickel-based self-fluxing alloy according to claim 1, wherein the nickel-based self-fluxing alloy comprises at least one metal selected from Group 3 elements.

16. The nickel-based self-fluxing alloy according to claim 15, wherein the nickel-based self-fluxing alloy comprises the at least one metal selected from Group 3 elements in an amount of ranging from 0 percent to 10 percent by mass.

17. The nickel-based self-fluxing alloy according to claim 16, wherein the at least one metal selected from Group 3 elements is yttrium (Y).

18. The nickel-based self-fluxing alloy according to claim 1, wherein the nickel-based self-fluxing alloy comprises at least one metal selected from Group 7 elements.

19. The nickel-based self-fluxing alloy according to claim 18, wherein the nickel-based self-fluxing alloy comprises the at least one metal selected from Group 7 elements in an amount of ranging from 0 percent to 10 percent by mass.

20. The nickel-based self-fluxing alloy according to claim 19, wherein the at least one metal selected from Group 7 elements is manganese (Mn) or rhenium (Re).

21. The nickel-based self-fluxing alloy according to claim 1, wherein the nickel-based self-fluxing alloy comprises at least one metal selected from Group 8 elements.

22. The nickel-based self-fluxing alloy according to claim 21, wherein the nickel-based self-fluxing alloy comprises the at least one metal selected from Group 8 elements in an amount of ranging from 0 percent to 30 percent by mass.

23. The nickel-based self-fluxing alloy according to claim 22, wherein the at least one metal selected from Group 8 elements is iron (Fe).

24. The nickel-based self-fluxing alloy according to claim 1, wherein the nickel-based self-fluxing alloy comprises at least one metal selected from Group 11 elements.

25. The nickel-based self-fluxing alloy according to claim 24, wherein the nickel-based self-fluxing alloy comprises the at least one metal selected from Group 11 elements in an amount of ranging from 0 percent to 10 percent by mass.

26. The nickel-based self-fluxing alloy according to claim 25, wherein the at least one metal selected from Group 11 elements is copper (Cu) or silver (Ag).

27. The nickel-based self-fluxing alloy according to claim 1, wherein the nickel-based self-fluxing alloy has characteristics such that, when the nickel-based self-fluxing alloy is formed into a plate, heated to 480° C., and placed to be inclined at 70 degrees with respect to the horizontal, and 0.3 g of molten glass heated to 1,000° C. is dropped onto the heated plate of the nickel-based self-fluxing alloy, the molten glass slides down without adhering to the plate of the nickel-based self-fluxing alloy.

28. The nickel-based self-fluxing alloy according to claim 1, wherein the glass manufacturing member is a member for transporting or molding glass at temperatures between 400° C. and 1400° C.

* * * * *

UNITED STATES PATENT AND TRADEMARK OFFICE
CERTIFICATE OF CORRECTION

| | | |
|---|---|---|
| PATENT NO. | : 11,643,708 B2 | |
| APPLICATION NO. | : 17/613412 | |
| DATED | : May 9, 2023 | |
| INVENTOR(S) | : Daisuke Kawamata | |

It is certified that error appears in the above-identified patent and that said Letters Patent is hereby corrected as shown below:

On the Title Page

Item (73), Assignee insert: --TOYO GLASS CO., LTD., Tokyo (JP)--

Signed and Sealed this
Fifteenth Day of August, 2023

Katherine Kelly Vidal
*Director of the United States Patent and Trademark Office*